US011203694B2

(12) United States Patent
Hoffman, Jr. et al.

(10) Patent No.: US 11,203,694 B2
(45) Date of Patent: Dec. 21, 2021

(54) ANTI-MICROBIAL COATING FOR THE PREVENTION OF BIOFOULING

(71) Applicant: The Johns Hopkins University, Baltimore, MD (US)

(72) Inventors: Christopher M. Hoffman, Jr., Odenton, MD (US); Adam W. Freeman, Laurel, MD (US); Konstantinos Gerasopoulos, Odenton, MD (US); James K. Johnson, Silver Spring, MD (US); Felix C. Sage, Ijamsville, MD (US); Spencer A. Langevin, Columbia, MD (US); Reid E. Messersmith, Jessup, MD (US)

(73) Assignee: The Johns Hopkins University, Baltimore, MD (US)

( * ) Notice: Subject to any disclaimer, the term of this patent is extended or adjusted under 35 U.S.C. 154(b) by 202 days.

(21) Appl. No.: 16/545,781

(22) Filed: Aug. 20, 2019

(65) Prior Publication Data

US 2020/0248008 A1 Aug. 6, 2020

Related U.S. Application Data

(60) Provisional application No. 62/799,276, filed on Jan. 31, 2019.

(51) Int. Cl.
*C09D 5/16* (2006.01)
*C09D 171/02* (2006.01)
*C09D 133/06* (2006.01)

(52) U.S. Cl.
CPC ......... *C09D 5/1662* (2013.01); *C09D 5/1687* (2013.01); *C09D 5/1693* (2013.01); *C09D 133/066* (2013.01); *C09D 171/02* (2013.01)

(58) Field of Classification Search
CPC .. C09D 5/1662; C09D 5/1693; C09D 5/1687; C09D 171/02; C09D 133/066
USPC .......................................................... 523/177
See application file for complete search history.

(56) References Cited

U.S. PATENT DOCUMENTS

| 7,335,248 | B2 * | 2/2008 | Abou-Nemeh | A01N 59/16 106/15.05 |
| 10,179,114 | B2 * | 1/2019 | Messersmith | A01N 43/16 |
| 2011/0105421 | A1 | 5/2011 | Mathee et al. | |
| 2012/0321566 | A1 * | 12/2012 | Liu | A01N 43/16 424/48 |
| 2018/0125066 | A1 * | 5/2018 | Bassler | C12Q 1/18 |
| 2019/0023909 | A1 | 1/2019 | Price et al. | |

OTHER PUBLICATIONS

Kratochvil et al. "Nanoporous Superhydrophobic Coatings that Promote the Extended Release of Water-Labile Quorum Sensing Inhibitors and Enable LongTerm Modulation of Quorum Sensing in *Staphylococcus aureus*" ACS "Biomaterials Science & Engineering", 2015, 1, 1039-1049. (Year: 2015).*

(Continued)

*Primary Examiner* — Michael M. Bernshteyn
(74) *Attorney, Agent, or Firm* — Todd R. Farnsworth

(57) ABSTRACT

An anti-fouling coating comprising a polymeric compound, wherein a backbone of the polymeric compound is covalently bonded to a quorum sensing inhibitor, and wherein the anti-fouling coating has substantially no bactericidal activity, the quorum sensing inhibitor is substantially non-leaching from the anti-fouling coating, or both.

20 Claims, 3 Drawing Sheets

Comparative Example 1

Bare space (%)         12.2

Biofilm coverage (%)   87.8

(56) References Cited

OTHER PUBLICATIONS

Kratochvil et al., "Nanoporous Superhydrophobic Coatings that Promote the Extended Release of Water-Labile Quorum Sensing Inhibitors and Enable Long-Term Modulation of Quorum Sensing in *Staphylococcus aureus*," ACS Biomater. Sci. Eng., 2015, pp. 1039-1049, vol. 1, ACS Publications.

Kratochvil et al., "Nonwoven Polymer Nanofiber Coatings That Inhibit Quorum Sensing in *Staphylococcus aureus*: Toward New Nonbactericidal Approaches to Infection Control," ACS Infect. Dis., 2017, pp. 271-280, vol. 3, ACS Publications.

Zakrewsky et al., "Ionic liquids as a class of materials for transdermal delivery and pathogen neutralization," PNAS, 2014, pp. 13313-13318, vol. 111, No. 37.

Dobretsov et al., "Inhibition of marine biofouling by bacterial quorum sensing inhibitors," Biofouling, 2011, pp. 893-905, vol. 27, No. 8.

Zakrewsky et al., "Choline and Geranate Deep Eutectic Solvent as a Broad-Spectrum Antiseptic Agent for Preventive and Therapeutic Applications," Adv. Healthcare Mater., 2016, pp. 1282-1289, vol. 5.

* cited by examiner

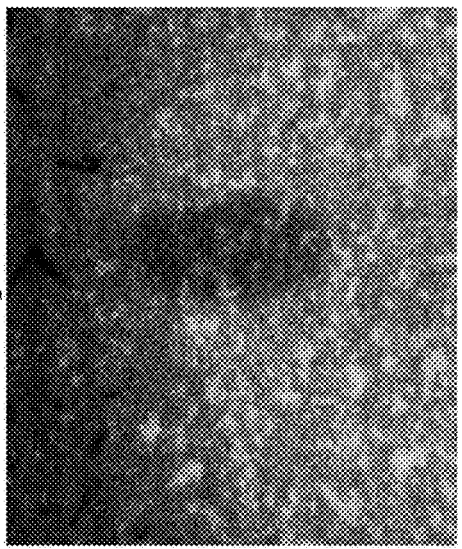
FIG. 1C Example 1
Bare space (%) 52.1
Biofilm coverage (%) 47.9
FIG. 1B Comparative Example 2
Bare space (%) 35.9
Biofilm coverage (%) 64.1
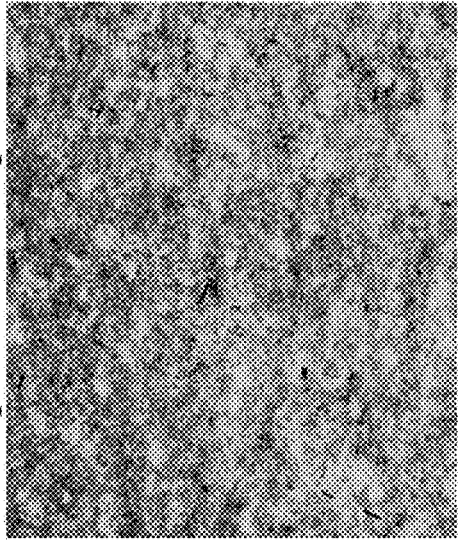
FIG. 1A Comparative Example 1
Bare space (%) 12.2
Biofilm coverage (%) 87.8

ANTI-MICROBIAL COATING FOR THE PREVENTION OF BIOFOULING

CROSS REFERENCE TO RELATED APPLICATIONS

This application claims priority to and the benefit of U.S. Provisional Application No. 62/799,276 filed on Jan. 31, 2019, the entire disclosure of which is incorporated herein by reference.

BACKGROUND

Biofouling, the growth of organisms on surfaces submerged in water, occurs in various industries. One of the most frequent biofouling sites is on the hulls of ships. Bacterial colonization of a submerged surface and subsequent biofilm formation are the initial steps of biofouling. The bacterial biofilm serves as a food source for other fouling organisms such as barnacles and tube worms. Once a biofilm is formed, it typically resists further treatment and acts as a constant source of microbial contamination. A significant problem associated with biofilms on ships is the eventual corrosion of the hull, leading to the ship's deterioration. Biofouling on boat hulls also increases frictional resistance or hydrodynamic drag during movement through the water, the consequence being reduced speeds, decreased maneuverability, and increased fuel costs. Parts of a ship other than the hull are also affected by biofouling, such as heat exchangers, water-cooling pipes, and propellers. Biofouling is also a problem for static marine structures because the resistance of thick layers of biofouling to waves and currents can cause unpredictable and potentially dangerous stresses in the structure. In addition, biofouling can impair the ability to inspect the structure for defects such as stress cracking and corrosion.

Biofouling has been inhibited using anti-fouling compounds or paints containing a biocide that is gradually leached from the paint. Anti-fouling paints include biocides such as organometallic compounds of copper, tin, or zinc, such as tributyl tin (TBT), or organic compounds such as fungicides, algicides, or bactericides. However, these anti-fouling coatings contain substances toxic to aquatic life, and are undesirable because of the damaging effects of such toxins when released into the aquatic environment. Additionally, the constant release of the anti-fouling component results in a continuing decrease of anti-fouling activity over time.

Another method of inhibiting biofilm formation is the use of foul-release coatings. These coatings use silicon-containing elastomers that provide a smooth surface having a low surface energy, which can impair or weaken the attachment of marine organisms to the coated surface. The anti-fouling ability of such coatings relies on the constant movement of the surface to remove the attached organisms, which limits their effectiveness when used on slower-moving vessels or static marine structures.

There remains a continuing need for methods of preventing the formation of biofouling and corresponding anti-fouling coatings that have improved efficacy and less environmental toxicity.

BRIEF DESCRIPTION

Provided is an anti-fouling coating including a polymeric compound, wherein a backbone of the polymeric compound is covalently bonded to a quorum sensing inhibitor, and wherein the anti-fouling coating has substantially no bactericidal activity, the quorum sensing inhibitor is substantially non-leaching from the anti-fouling coating, or a combination thereof.

Also provided is a curable composition including a first monomer of formula (1)

$$R\text{-}(L^1)_m\text{-}Q \qquad (1)$$

and optionally a second monomer of formula (2)

$$R^2\text{-}(L^2)_n\text{-}R^3 \qquad (2)$$

wherein, in formulae (1) and (2), $R^1$ and $R^2$ are each independently a polymerizable group; $R^3$ is hydrogen, halide, hydroxy, amino, thiol, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), —N(R$^9$)(R$^{10}$), or a second polymerizable group; each occurrence of $L^1$ is independently $C_{1-12}$ alkylene, $C_{2-12}$ alkenylene, $C_{6-12}$ arylene, —C(O)—, —O—, —N(R$^{11}$)—, —S—, —S(O)—, —S(O)$_2$—, or —Si(O)(R$^{12}$)(R$^{13}$)—; each occurrence of $L^2$ is independently $C_{1-12}$ alkylene, $C_{2-12}$ alkenylene, $C_{6-12}$ arylene, —C(O)—, —O—, —N(R$^{11}$)—, —S—, —S(O)—, —S(O)$_2$—, or —Si(O)(R$^{12}$)(R$^{13}$)—; $R^4$ to $R^6$ are each independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; $R^7$ to $R^{11}$ are each independently hydrogen, $C_{1-12}$ alkyl, $C_{2-12}$ alkoxyalkyl, $C_{2-12}$ alkenyl, $C_{3-8}$ cycloalkyl, $C_{6-14}$ aryl, $C_{7-13}$ aryloxyalkyl, $C_{7-13}$ arylalkyl, or $C_{7-13}$ alkylaryl; $R^{12}$ to $R^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; Q is a quorum sensing inhibitor; and m and n are each independently 0 to 1,000.

A method of inhibiting biofilm formation on a substrate is provided, and includes applying a curable composition to a surface of the substrate; and curing the curable composition to form an anti-fouling coating on the surface of the substrate, wherein the anti-fouling coating includes a polymeric compound, wherein a backbone of the polymeric compound is covalently bonded to a quorum sensing inhibitor, and wherein the anti-fouling coating has substantially no bactericidal activity, the quorum sensing inhibitor is substantially non-leaching from the anti-fouling coating, or a combination thereof.

The above described and other features are exemplified by the following figures and detailed description.

BRIEF DESCRIPTION OF THE DRAWINGS

The following figures are exemplary embodiments.

FIG. 1A is a fluorescent microscope image according to Comparative Example 1.

FIG. 1B is a fluorescent microscope image according to Comparative Example 2.

FIG. 1C is a fluorescent microscope image according to Example 1.

DETAILED DESCRIPTION

Figure 2B:
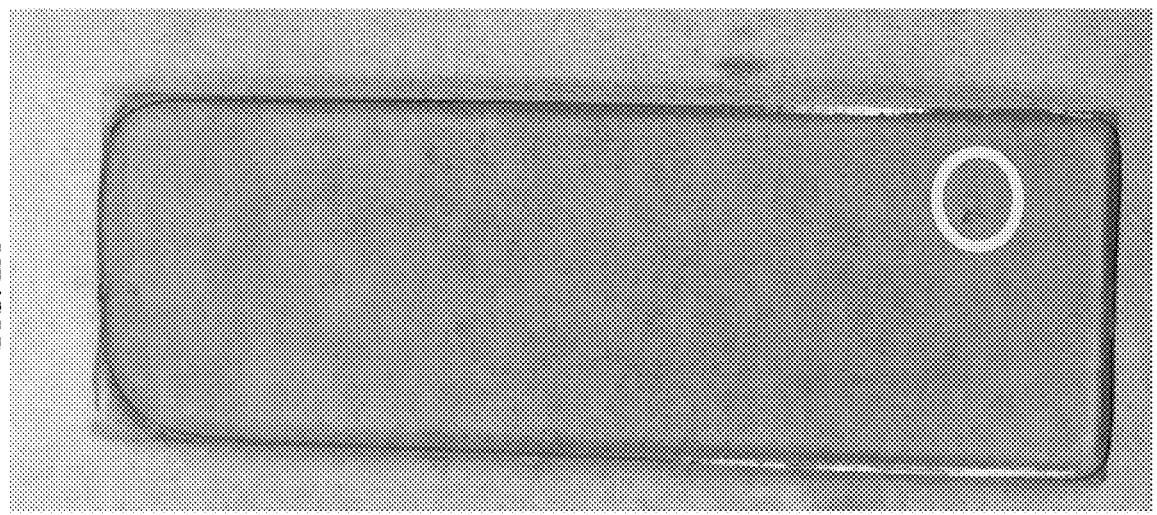
FIGS. 2A and 2B are photographic images of glass slides with thick anti-fouling coatings according to one or more aspects of Example 3.

Biofilms are communities of bacterial cells adhered to surfaces and encased in a self-produced matrix of extracellular polymeric substances. The formation of a biofilm involves chemical signaling between bacteria, or quorum-sensing (QS), to coordinate the formation and growth of the biofilm based on environmental conditions. Thus, an anti-fouling coating based on QS inhibition can prevent the formation of a biofilm at the earliest stages of biofilm growth.

The present inventors have discovered a method of reducing or preventing the formation of biofilms on surfaces, and in particular on the surfaces of marine structures that are in contact with water. The method includes providing an anti-fouling coating to these surfaces, where the coating provides inhibition of biofilm formation without causing substantial harm to the surrounding marine environment. More specifically, provided are monomers or oligomers having one or more polymerizable reactive groups in addition to a quorum sensing inhibitor (QSI) moiety, which can be reacted with themselves or with counterpart monomers having polymerizable reactive groups to form a polymeric compound that has a covalently bonded pendant QSI moiety. The resulting polymeric compound can be used as an anti-fouling coating to prevent biofilm formation and biofouling where the anti-fouling coating has no bactericidal activity, the pendant QSI moiety is substantially non-leaching from the anti-fouling coating, or both. In other words, the covalently bonded QSI group of the anti-fouling coating prevents the formation of biofilms without deleterious effects on the local or extended biosystem.

As used herein, the term "biofilm" refers to an accumulation of microorganisms on a surface. Exemplary microorganisms include bacteria archaea, fungi, molds, algae, protozoa, or a combination thereof. A mature biofilm can include a colony of microorganisms resident upon a surface surrounded by an exopolysaccharide, rendering the mature biofilm more difficult to eradicate. The anti-fouling coating of the present disclosure can use QSI to effectively prevent the formation of the mature biofilm.

As used herein, the terms "anti-fouling coating" and "biofilm resistant coating" are interchangeable and refer to any coating (as defined herein) that impairs, inhibits, prevents, or retards the attachment and/or growth of biofouling organisms.

The anti-fouling coating includes a polymeric compound having a backbone structure that is covalently bonded to a quorum sensing inhibitor (QSI) group or moiety. The QSI group or moiety is a pendant group of the polymer backbone and one or more pendant QSI groups or moieties are covalently bonded to the backbone of the polymeric compound. Each pendant QSI of the polymeric compound can be the same or different. It is to be understood that a polymeric compound including a pendant QSI group means the backbone of the polymeric compound is covalently bonded to the QSI group. Thus, as used herein, the term "pendant QSI" refers to a QSI that is covalently bonded to the backbone of the polymeric compound.

The anti-fouling coating can have substantially no bactericidal activity. For example, the anti-fouling coating can have no bactericidal activity. As used herein, the term "substantially no bactericidal activity" means the number colony forming units per milliliter (CFU/mL) of a bacterium susceptible to quorum sensing inhibition by the QSI compound or derivative thereof decreases by less than 25%, preferably less than 10%, more preferably less than 5% following 6 hours of incubation in a solution containing a substrate having the anti-fouling coating disposed thereon. The bactericidal activity of the anti-fouling coating can be determined, for example, by plate culture of the bacterial inoculum following the incubation with the anti-fouling coating. The resulting concentration of each inoculum can be compared to a solution obtained from an uncoated substrate that was incubated with the same bacterium under the same conditions. The bactericidal activity of the anti-fouling coating can be determined from the difference in inoculum concentration (CFU/mL) following incubation with the respective coated and uncoated substrates. In an aspect, the anti-fouling coating has substantially no biocidal activity.

The pendant QSI can be substantially non-leaching from the anti-fouling coating after a period of aging. For example, the pendant QSI can be non-leaching from the anti-fouling coating. The extent of pendant QSI leaching from the anti-fouling coating can be determined by any appropriate method. For example, a coated substrate having the anti-fouling coating can be immersed in sea water or an equivalent controlled medium for a period of aging and the amount of remaining QSI functionality in the anti-fouling coating can be determined. In another example, the amount of QSI leaching can be determined based on the amount of residual QSI that is found in the sea water or equivalent controlled medium after a period of aging. Optionally, these measurements can be performed in the presence or absence of bacterium, for example using an enriched marine broth inoculated with bacterium, to determine the effect of the bacterium on the rate or amount of leaching as a result of, for example, the bacterium hydrolyzing the linkages between the pendant QSI and the polymeric backbone. As used herein, "substantially non-leaching" means the anti-fouling coating retains greater than 50%, 55%, 60%, 65%, 70%, 75%, 80%, 85%, 90%, 95%, or 99% by weight of the original amount of pendant QSI groups after aging in a marine environment. The pendant QSI of the anti-fouling coating can be substantially non-leaching for 7, 14, 20, 30, 60, 90, 120, 240, or 365 days in a marine environment. As used herein, a "marine environment" refers to sea water or an equivalent controlled medium such as a marine broth, and can further include other conditions such as agitation, elevated temperatures, exposure to sunlight, or the like, or a combination of such conditions.

The pendant QSI is a group or moiety that is derived from a QSI compound, has a structure that is substantially similar to a QSI compound, or both. Exemplary QSI groups include, but are not limited to, a gallic acid (3,4,5-trihydroxybenzoic acid) group, a pyrogallol (1,2,3-trihydroxybenzene) group, a catechol (1,2-dihydroxy benzene) group, an ellagic acid 4,4',5,5',6,6'-hexhydrodiphenic acid 2,6,2',6'-dilactone) group, a kojic acid (5-hydroxy-2-(hydroxymethyl)-4-pyrone) group, a quercetin (2-(3,4-dihydroxyphenyl)-3,5,7-trihydroxy-4H-chromen-4-one) group, a resveratrol (2-(3,4-dihydroxyphenyl)-3,5,7-trihydroxy-4H-chromen-4-one) group, a chrysin (5,7-dihydroxy-2-phenyl-4H-chromen-4-one) group, an apigenin (4',5,7-trihydroxyflavone) group, a baicalein (5,6,7-trihydroxyflavone) group, a diydroxyflavone (including 4',7-dihydroxy flavone and 7,8-dihydroxy flavone) group, a trihydroxyflavone (including 5,7,8-trihydroxyflavone, 3,5,7-trihydroxyflavone, and 7,8,3'-trihydroxyflavone) group, a naringenin (4',5,7-trihydroxyflavone) group, a phloretin (3-(4-hydroxyphenyl)-1-(2,4,6-trihydroxyphenyl)propan-1-one) group, a pinocembrin (5,7-dihydroxy-2-phenyl-2,3-dihydro-4H-chromen-4-one) group, a 4-nitropyridine-N-oxide group, a furanone group, a thiazolidinedione group, an aminobenzene sulfonamide group, a nitrobenzene sulfonamide group, an N-acyl homoserine lactone group, a demethoxyencecalin (1-(2,2-dimethyl-2h-chromen-6-yl)ethenone) group, or a combination thereof. Linking of each of the foregoing groups is described in further detail below.

Preferably, the QSI is a gallic acid group, a kojic acid group, an N-acyl homoserine lactone group, a demethoxyencecalin group, or a combination thereof. For example, a QSI group that is a gallic acid group means the pendant QSI is derived from gallic acid, has a structure that is substantially similar to the structure of gallic acid, or both. "Substantially similar" as used herein refers to derivatives having minor alterations or homologies in the foregoing structures that do not significantly adversely affect the desired QSI property of the groups. Such substitutions can include, for example, substitution of one or more hydrogen atoms with a halogen, nitro, cyano, $C_{1-3}$ alkyl, or $C_{2-3}$ alkenyl group; substitution of a ring oxygen atom with a heteroatom such as nitrogen; derivatization of a hydroxyl group with a $C_{1-6}$ carboxylic acid to provide an ester; replacement of a hydroxyl group with another hydrogen-bonding group such as an unsubstituted amine group; or the like.

The pendant QSI can be selected based on the bacteria present at or near the surface to receive the anti-fouling coating. Exemplary genera of bacteria susceptible to QSI include, but are not limited to, *Roseovarius, Sagittula, Rhodobacter, Roseobacter, Silicibacter, Reugeria, Sulfitobacter, Pseudomonas, Geobacillus, Shewanella, Vibrio, Acetobacter, Gluconacetobacter, Caulobacter, Pseudoalteromonas, Acinetobacter, Psychrobacter, Bacillus*, or the like, or species thereof.

The polymeric compound can be a homopolymer or a copolymer. The term "copolymer" refers to a polymeric compound having at least two different structural repeat units and includes random copolymers, alternating copolymers, graft copolymers, star copolymers, and block copolymers. For example, the polymeric compound can be a homopolymer having a single type of pendant QSI, wherein each structural unit of the polymeric compound includes the pendant QSI. When the polymeric compound is a copolymer, it includes 0.1 weight percent (wt %) to 99 wt % of structural units derived from a monomer including the pendant QSI, based on the total weight of structural units in the polymeric compound being 100 wt %. For example, the copolymer can include 5 to 75 wt %, or 5 to 50 wt %, or 5 to 25 wt % of structural units derived from a monomer including the pendant QSI, based on the total weight of structural units in the polymeric compound being 100 wt %. For example, the polymeric compound can include 50 to 75 wt %, or 25 to 60 wt %, or 5 to 25 wt % of structural units derived from a monomer including the pendant QSI, based on the total weight of structural units in the polymeric compound being 100 wt %.

The pendant QSI that is covalently bonded to the backbone of the polymeric compound can be introduced during the synthesis of the polymeric compound via a monomer that is covalently bonded to the QSI group. It is to be understood that a monomer including a pendant QSI group refers to a monomer that is covalently bonded to the QSI group, and both are synonymous with "QSI-containing monomer" and "QSI monomer."

The QSI-containing monomer can be prepared using any method. For example, the QSI group can be attached to an appropriately functionalized monomer compound directly, or the QSI group can be functionalized with a linking group to connect the functionalized QSI group and the monomer compound. For example, the polymeric compound can include one or more structural units derived from a compound or monomer of formula (1)

$$R-(L^1)_m-Q \qquad (1)$$

wherein $R^1$ is a polymerizable group, $L^1$ is a linking group, and Q is the QSI group. Exemplary polymerizable groups $R^1$ include, but are not limited to, (meth)acrylate, glycidyl ether, N-vinyl (i.e., vinylamine), vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl. Each occurrence of linking group $L^1$ can be the same or different, and each independently can be $C_{1-12}$ alkylene, $C_{2-12}$ alkenylene, $C_{6-12}$ arylene, —C(O)—, —O—, —N(R$^{11}$)—, —S—, —S(O)—, —S(O)$_2$—, or —Si(O)(R$^{12}$)(R$^{13}$2)(R$^{11}$)—. In formula (1), $R^{11}$ is hydrogen, $C_{1-12}$ alkyl, $C_{2-12}$ alkoxyalkyl, $C_{2-12}$ alkenyl, $C_{3-8}$ cycloalkyl, $C_{6-14}$ aryl, $C_{7-13}$ aryloxyalkyl, $C_{7-13}$ arylalkyl, or $C_{7-13}$ alkylaryl. In formula, (1) $R^{12}$ to $R^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl. In formula (1), m can be 0 to 1,000, preferably 1 to 100, more preferably 1 to 50, even more preferably 1 to 25. For example, the monomer of formula (1) can be $R^1$—(CH$_2$CH$_2$O)$_{1-20}$-Q, wherein each occurrence of L is —O— or $C_2$ alkylene, with the proviso that each occurrence of $L^1$ is different from the adjacent occurrences of $L^1$, wherein m is 2 to 40.

Preferably, the polymerizable group $R^1$ is (meth)acrylate, (meth)acrylamide, itaconic acid, norbornene, vinylsilane, alkoxysilane, halosilane, vinylester, vinylether, or vinylamide; each linking group $L^1$ is $C_{1-12}$ alkylene or $C_{1-6}$ alkylene, —C(O)—, —O—, or —N(R$^{11}$)— wherein $R^{11}$ is hydrogen, $C_{1-6}$ alkyl, $C_{2-6}$ alkoxyalkyl, $C_{7-13}$ aryloxyalkyl, $C_{7-13}$ arylalkyl, or $C_{7-13}$ alkylaryl, and m is 1 to 50. More preferably, the polymerizable group $R^1$ is (meth)acrylate, each linking group $L^1$ is $C_{1-6}$ alkylene, —C(O)—, or —O—, and m is 1 to 25.

The linking group $L^1$ can be connected to any position of the QSI compound provided that it does not interfere with the QSI function. Any method can be used to prepare the monomer of formula (1). For example, a particular monomer compound of formula (1) wherein the QSI is a gallic acid group can be of formula (1a)

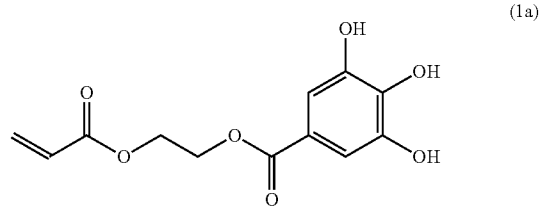 [SMILES: C=CC(=O)OCCOC(=O)c1cc(O)c(O)c(O)c1]

(1a)

Other exemplary monomers of formula (1) wherein the QSI group is a gallic acid group include, but are not limited to, compounds of the formulas:

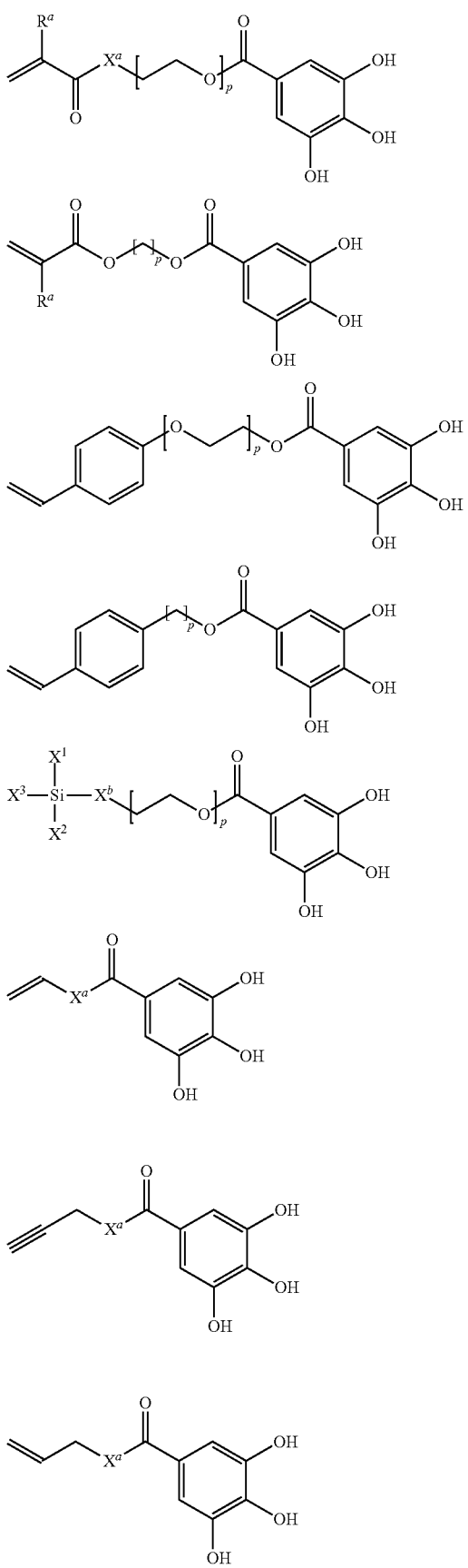

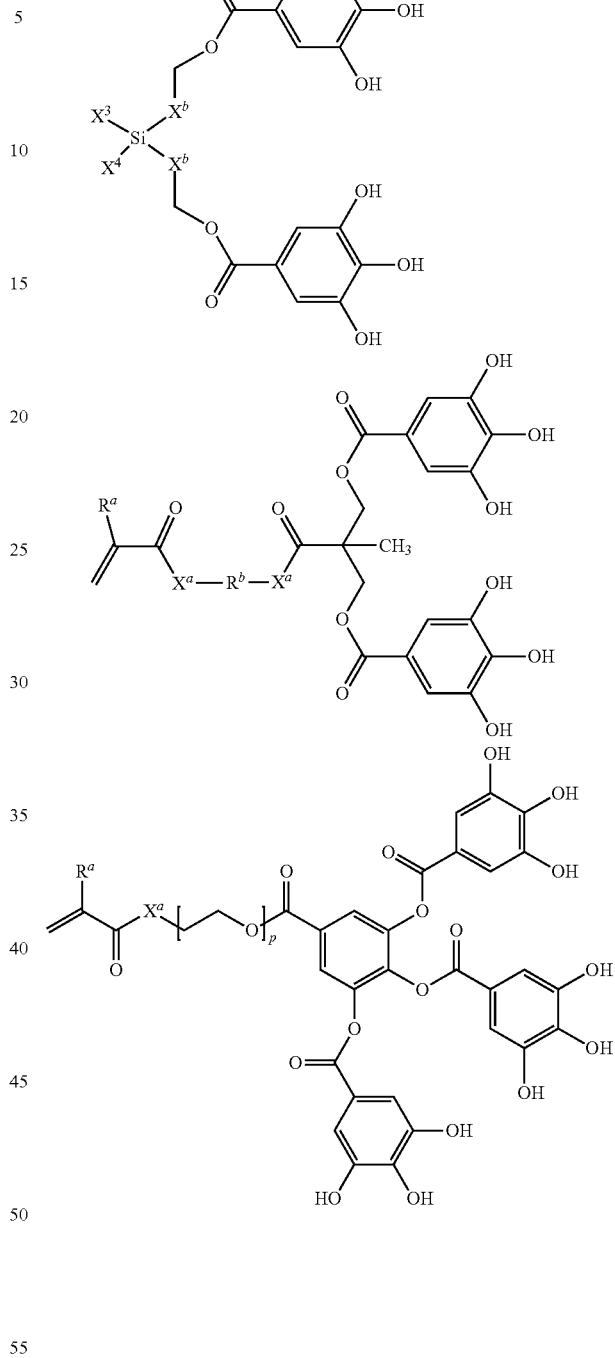

wherein $R^a$ is H, $C_{1-12}$ alkyl, $CH_2OH$, or $CO_2OH$; $R^b$ is $C_{1-12}$ alkylene or $(CH_2CH_2O)_{1-20}$; each $X^a$ is independently O, NH, or S; $X^b$ is $CH_2$, O, or NH; $X^1$ and $X^2$ are each independently halogen, H, $C_{1-12}$ alkyl, $C_{2-12}$ alkenyl, $C_{1-12}$ alkoxy, or $C_{3-8}$ cycloalkoxy; $X^3$ is halogen or $C_{1-12}$ alkoxy; $X^4$ is halogen, $C_{2-12}$ alkenyl, or $C_{1-12}$ alkoxy and p is an integer from 1 to 100, preferably from 1 to 50, more preferably from 1 to 20.

Exemplary monomers of formula (1) wherein the QSI group is a kojic acid group include, but are not limited to, compounds of the formulas:

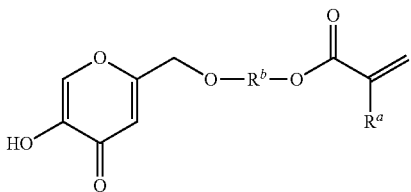

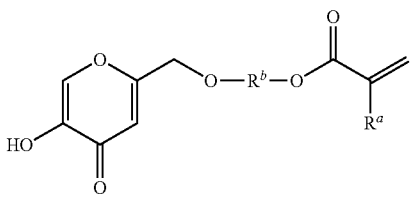

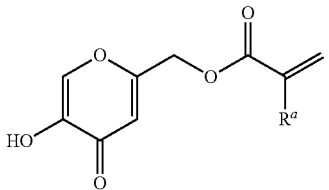

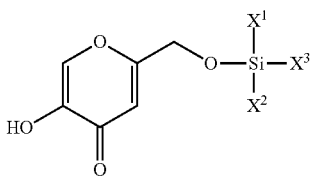

wherein $R^a$ is H, $C_{1-12}$ alkyl, $CH_2OH$, or $CO_2OH$; $R^b$ is $C_{1-12}$ alkylene or $(CH_2CH_2O)_{1-20}$; $X^1$ and $X^2$ are each independently halogen, H, $C_{1-12}$ alkyl, $C_{2-12}$ alkenyl, $C_{1-12}$ alkoxy, or $C_{3-8}$ cycloalkoxy; and $X^3$ is halogen or $C_{1-12}$ alkoxy.

Exemplary monomers of formula (1) wherein the QSI group is an N-acyl homoserine lactone group include, but are not limited to, compounds of the formulas:

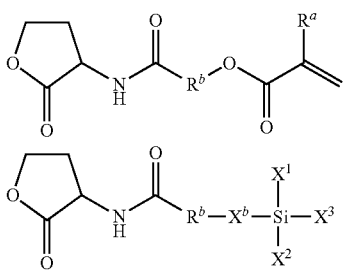

wherein $R^a$ is H, $C_{1-12}$ alkyl, $CH_2OH$, or $CO_2OH$; $X^b$ is $CH_2$, O, or NH; $X^1$ and $X^2$ are each independently halogen, H, $C_{1-12}$ alkyl, $C_{2-12}$ alkenyl, $C_{1-12}$ alkoxy, or $C_{3-8}$ cycloalkoxy; and $X^3$ is halogen or $C_{1-12}$ alkoxy.

An exemplary monomer of formula (1) wherein the QSI group is a demethoxyencecalin group includes, but is not limited to, a compound of the formula

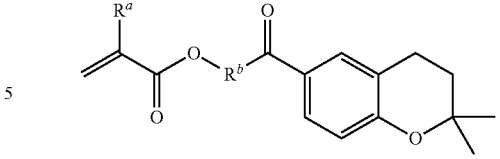

wherein $R^a$ is H, $C_{1-12}$ alkyl, $CH_2OH$, or $CO_2OH$; and $R^b$ is $C_{1-12}$ alkylene or $(CH_2CH_2O)_{1-20}$.

The polymeric compound optionally includes one or more structural units derived from a second monomer of formula (2)

(2)

wherein $R^2$ is a polymerizable group that is (meth)acrylate, glycidyl ether, N-vinyl, vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl. Each occurrence of $L^2$ is independently $C_{1-12}$ alkylene, $C_{2-12}$ alkenylene, $C_{6-12}$ arylene, —C(O)—, —O—, —N($R^{11}$)—, —S—, —S(O)—, —S(O)$_2$—, or —Si(O)($R^{12}$)($R^{13}$)—, wherein $R^{11}$ is hydrogen, $C_{1-12}$ alkyl, $C_{2-12}$ alkoxyalkyl, $C_{2-12}$ alkenyl, $C_{3-8}$ cycloalkyl, $C_{6-14}$ aryl, $C_{7-13}$ aryloxyalkyl, $C_{7-13}$ arylalkyl, or $C_{7-13}$ alkylaryl. In formula (2), $R^{12}$ and $R^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl. In formula (2), n can be 0 to 1,000, preferably 1 to 100, more preferably 1 to 50, even more preferably 1 to 25. For example, the monomer of formula (2) can be $R^2$—$(CH_2CH_2O)_{1-20}$—$R^3$, wherein each occurrence of $L^2$ is —O— or $C_2$ alkylene, with the proviso that each occurrence of $L^2$ is different from the adjacent occurrences of $L^2$, wherein n is 2 to 40.

In formula (2), $R^3$ is hydrogen, halide, hydroxy, amino, thiol, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)$R^4$, —OC(O)$R^5$, —C(O)O$R^6$, —C(O)N($R^7$)($R^8$), —N($R^9$)($R^{10}$), or a second polymerizable group as defined above for the polymerizable group $R^2$. The second polymerizable group $R^3$ can be the same as or different from the polymerizable group $R^2$. In formula (2), $R^4$ to $R^6$ are each independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy. In formula (2), $R^7$ to $R^{10}$ are each independently hydrogen, $C_{1-12}$ alkyl, $C_{2-12}$ alkoxyalkyl, $C_{2-12}$ alkenyl, $C_{3-8}$ cycloalkyl, $C_{6-14}$ aryl, $C_{7-13}$ aryloxyalkyl, $C_{7-13}$ arylalkyl, or $C_{7-13}$ alkylaryl.

Preferably, in formula (2) the polymerizable group $R^2$ is (meth)acrylate, styrene, (meth)acrylamide, itaconic acid, norbornene, vinylsilane, alkoxysilane, halosilane, vinylester, vinylether, or vinylamide; each linking group $L^2$ is $C_{1-12}$ alkylene or $C_{1-6}$ alkylene, —C(O)—, —O—, or —N($R^{11}$)— wherein $R^{11}$ is hydrogen, $C_{1-6}$ alkyl, $C_{2-6}$ alkoxyalkyl, $C_{7-13}$ aryloxyalkyl, $C_{7-13}$ arylalkyl, or $C_{7-13}$ alkylaryl, $R^3$ is hydrogen, halide, hydroxy, amino, thiol, or a second polymerizable group, and m is 1 to 50. More preferably, the polymerizable group $R^2$ is (meth)acrylate, each linking group $L^2$ is $C_{1-6}$-alkylene, —C(O)—, or —O—, $R^3$ is hydrogen, hydroxy, or a second polymerizable group, and m is 1 to 25.

Exemplary monomers of formula (2) include, but are not limited to, $C_{1-14}$ alkyl (meth)acrylate esters; $C_{7-14}$ arylalkyl (meth)acrylate esters; $C_{1-14}$ hydroxyalkyl (meth)acrylate esters; $C_{4-14}$ poly(alkylene glycol) mono(meth)acrylates; $C_{2-14}$ alkoxyalkyl (meth)acrylates; (meth)acrylic acid; (meth)acrylonitrile; $C_{1-14}$ alkyl (meth)acrylamide and derivatives thereof; vinylic monomers such as styrenes, vinylesters, vinylamides, vinylethers, vinyl pyrrolidones, vinyl halides, or the like; or di(meth)acrylate esters of alkane diols such as 1,4-butanediol diacrylate and 1,6-hexane diol diacrylate. For example, the monomer of formula (2) can be hydroxyethyl (meth)acrylate, hydroxypropyl (meth)acrylate, 4-hydroxybutyl (meth)acrylate, poly(ethylene glycol) di(meth)acrylate, 2-ethylhexyl (meth)acrylate, methyl (meth)acrylate, ethyl (meth)acrylate, isopropyl (meth)acrylate, n-propyl (meth)acrylate, n-butyl (meth)acrylate, n-amyl (meth)acrylate, n-hexyl (meth)acrylate, isoamyl (meth)acrylate, nonyl (meth)acrylate, lauryl (meth)acrylate, stearyl (meth)acrylate, trimethylcyclohexyl (meth)acrylate, t-butylcyclohexyl (meth)acrylate, tetrahydrofurfuryl (meth)acrylate, cyclohexyl (meth)acrylate, isobornyl (meth)acrylate, 2-methoxyethyl (meth)acrylate, 2-(2-methoxyethoxy) ethyl (meth)acrylate, ethoxy triethylene glycol (meth)acrylate, methoxy poly (ethylene glycol) mono(meth)acrylate, poly(ethylene glycol) mono(meth)acrylate, benzyl (meth)acrylate, phenyl (meth)acrylate, (meth)acrylic acid or a salt thereof, (meth)acrylonitrile, dimethyl (meth)acrylamide, hydroxymethyl (meth)acrylamide, hydroxyethyl (meth)acrylamide, hydroxypropyl (meth)acrylamide, dimethylaminoethyl (meth)acrylamide, dimethylaminopropyl (meth)acrylamide, isopropyl (meth)acrylamide, diacetone (meth)acrylamide, N-phenyl (meth)acrylamide, N-methyl (meth)acrylamide, N,N-dimethyl (meth)acrylamide, N-isopropyl (meth)acrylamide, N-(2-hydroxypropyl) (meth)acrylamide, (meth)acrolein, N-vinylcaprolactam, N-vinylpyrrolidone, divinyl benzene, N-vinyl formamide, N-ethenyl acetamide, N-vinyl-N-methyl acetamide, isoprene, 1,3-butadiene, styrene, t-butylstyrene, isopropylstyrene, divinyl benzene, or a combination thereof.

The polymeric compound can further include additional structural units derived from other monomers in addition to those of formulas (1) and/or (2). For example, the polymeric compound can include one or more additional structural units derived from a third monomer compound. The third monomer can have the structure of formula (2), with the proviso that the second monomer is different from the third monomer, wherein $R^3$ of the third monomer is a second polymerizable group that is (meth)acrylate, glycidyl ether, N-vinyl, vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl. The polymeric compound can include structural units from one or more monomers of formula (1) and one or more monomers of formula (2), and optionally one or more third monomers. When two or more monomers of formula (1) are used, the QSI groups of the monomers of formula (1) can be the same or different.

The anti-fouling coating can be substantially free of metals that interfere with QSI functionality. For example, the anti-fouling coating can be substantially free of tin, copper, zinc, mercury, and lead. For example, the amount of each of tin, copper, zinc, mercury, and lead in the anti-fouling coating independently can be less than 100 parts per million by weight (ppm), preferably less than 10 ppm, more preferably less than 1 ppm, even more preferably less than 0.1 ppm, based on the total weight of the anti-fouling coating. For example, the total amount of tin, copper, zinc, mercury, and lead in the anti-fouling coating can be less than 100 ppm, preferably less than 10 ppm, more preferably less than 1 ppm, even more preferably less than 0.1 ppm, based on the total weight of the anti-fouling coating.

Also provided is a curable composition for preparing the anti-fouling coating described herein. The curable composition includes a first monomer of formula (1) and optionally a second monomer of formula (2), wherein each of formula (1) and formula (2) are as provided herein. For example, the curable composition can include 100 wt % of the first monomer, based on the total weight of the monomers in the curable composition being 100 wt %. Preferably, the curable composition includes 0.1 to 99 wt % of the first monomer; 1 to 70 wt % of the second monomer; and 0 to 35 wt % of a third monomer, based on the total weight of the monomers in the curable composition being 100 wt %. For example, the curable composition can include 5 to 75 wt % of the first monomer; 25 to 95 wt % of the second monomer; and 0 to 25 wt % of the third monomer, based on the total weight of the monomers in the curable composition being 100 wt %. For example, the curable composition can include 5 to 50 wt % of the first monomer; 50 to 95 wt % of the second monomer; and 0 to 35 wt % of the third monomer, based on the total weight of the monomers in the curable composition being 100 wt %. For example, the curable composition can include 5 to 25 wt % of the first monomer; 50 to 90 wt % of the second monomer; and 5 to 25 wt % of the third monomer, based on the total weight of the monomers in the curable composition being 100 wt %, wherein the third monomer has the structure of formula (2) wherein $R^3$ is a polymerizable group, and the second monomer is different from the third monomer. As used herein, the total weight of monomers in the curable composition does not include the weight of additives.

The curable composition can further include one or more additives such as an adhesion promoter, a cross-linker, a polymerization initiator, a surfactant, a thickener or anti-settling agent, an antioxidant, a colorant (such as pigments or dyes), an ultraviolet (UV) light stabilizer, a UV absorbing additive, a filler, a plasticizer, a reinforcing agent, or a combination thereof, with the proviso that the additives do not adversely affect the QSI properties of the anti-fouling coating. When present, the additives can be included in any effective amount, for example in an amount of 0.001 to 50 wt %, preferably 0.001 to 30 wt %, more preferably 0.005 to 20 wt %, even more preferably 0.01 to 10 wt % or 0.01 to 5 wt % based on the total weight of the curable composition. For example, the additive can be an adhesion promoter, a crosslinking agent, a polymerization initiator, or a combination thereof. Preferably, the additive does not have bactericidal activity.

There is considerable overlap among adhesion promoters and crosslinking agents, and the compounds described as adhesion promoters can be used as crosslinking agents and vice versa. Adhesion promoters include, for example, aminosilanes such as 3-aminopropyltriethoxysilane, 3-aminopropyltrimethoxysilane, N-2-aminoethyl-3-aminopropyltrimethoxysilane, triamino-functional propyltrimethoxysilane, bis(3-triethoxysilylpropyl)amine, bis(3-trimethoxysilylpropyl)amine, 2-aminoethyl-3-aminopropylmethyldimethoxysilane, N-(n-butyl)-3-aminopropyltrimethoxysilane, 3-aminopropylmethyldiethoxysilane, or the like; vinyl functional silanes such as vinyltriethoxysilane, vinyltrimethoxysilane, vinyltris(2-methoxyethoxy)silane, vinyltrimethoxysilane oligomers, vinyltriethoxysilane oligomers, or the like; epoxysilanes such as 3-glycidoxypropyltrimethoxysilane, 3-glycidoxypropyltriethoxysilane, 3-glycidoxypropyldiethoxymethoxysilane, 2-glycidoxypropyltrimethoxysilane, 2-(3,4-epoxy-4-methylcyclohexyl)-ethyltrimethoxysilane, 5,6-epoxy-hexyltriethoxysilane, or the like; (meth)acryl tri($C_{1-3}$ alkoxy)silanes such as 3-(trimethoxysilyl)methyl (meth)acrylate, 3-(trimethoxysilyl)propyl (meth)acrylate, or the like; ureidosilanes such as 3-ureidopropyltriethoxysilane or the like; ureido(meth)acrylates such as 2-(2-oxo-1-imidazolidinyl)ethyl (meth)acrylate or the like; polyether-functional trimethoxysilanes; halogen functional silanes such as 4-bromobutyltrimethoxysilane or the like; isocyanate functional silanes such as 3-isocyanatopropyltriethoxysilane or the like; aqueous aminosilane hydrolysates; aqueous amino/alkyl-functional siloxane co-oligomer; mercaptosilanes such as (3-mercaptopropyl)trimethoxysilane or the like; or a combination thereof.

Crosslinking agents include, for example, polyfunctional crosslinking monomers such as (meth)acrylate monomers having two or more (meth)acrylate moieties per monomer molecule. Exemplary polyfunctional monomers include, but are not limited to, di(meth)acrylates such as 1,6-hexanediol di(meth)acrylate, 1,4-cyclohexanediol di(meth)acrylate, tripropylene glycol di(meth)acrylate, neopentyl glycol di(meth)acrylate, neopentyl glycol propoxylate di(meth)acrylate, neopentyl glycol ethoxylate di(meth)acrylate, neopentyl glycol propoxylate di(meth)acrylate, neopentyl glycol ethoxylate di(meth)acrylate, polyethylene glycol di(meth)acrylate, glycerol di(meth)acrylate, or the like; tri(meth)acrylates such as trimethylolpropane tri(meth)acrylate, 1,2,4-butanetriol tri(meth)acrylate, trimethylolpropane ethoxylate tri(meth)acrylate, or the like; tri(meth)allyls such as tri(meth)allyl cyanurate, tri(meth)allyl isocyanurate, tri(meth)allyl esters of citric acid, tri(meth)allyl esters of phosphoric acid, pentaerythritol tri(meth)acrylate, tris(hydroxyethyl)isocyanurate tri(meth)acrylate, or the like; tetra(meth)acrylates such as pentaerythritol tetra(meth)acrylate or the like; penta(meth)acrylates such as dipentaerythritol penta(meth)acrylate or the like; hexa(meth)acrylates such as dipentaerythritol hexa(meth)acrylate, sorbitol hexa(meth)acrylate, or the like; glycidyl compounds such as glycidyl (meth)acrylate, (meth)allyl glycidyl ether, 1-chloro-2,3-epoxypropyl (meth)acrylate, 2-bromo-3,4-epoxybutyl (meth)acrylate, 2-(epoxyethyloxy)-ethyl (meth)acrylate, 2-(3,4-epoxybutyloxy)-ethyl (meth)acrylate, or the like; polythiol compounds such as trimethylolpropane tris(mercaptopropionate), pentaerythritol tetrakis(3-mercaptopropionate), or the like; silanes such as tetramethoxysilane, tetraethoxysilane, tetrapropoxysilane, tetra-n-butoxysilane, vinyltris(m-ethylethyloximino)silane, vinyltris-(acetoxime)silane, methyltris(methylethyloximino)silane, methyltris(acetoxime)silane, vinyltrimethoxysilane, methyltrimethoxysilane, vinyltris(isopropenoxy)silane, tetraacetoxy-silane, methyltriacetoxysilane, ethyltriacetoxysilane, vinyltriacetoxysilane, di-t-butoxy-diacetoxysilane, methyltris(ethyl lactate) silane, vinyltris(ethyl lactate)silane, or the like; carbodiimides such as N-(3-dimethylaminopropyl)-N'-ethylcarbodiimide hydrochloride, dicyclohexylcarbodiimide, or the like; or a combination thereof. The curable composition can optionally include a crosslinking catalyst, such as a carboxylic acid salt.

The polymerization initiator can be a photoinitiator. Exemplary photoinitiators can include phosphine oxide photoinitiators. Examples of such photoinitiators include the IRGACURE, LUCIRIN, and DAROCURE series of phosphine oxide photoinitiators available from BASF Corp.; the ADDITOL series from Allnex; and the ESACURE series of photoinitiators from Lamberti, s.p.a. Other exemplary photoinitiators include ketone-based photoinitiators, such as hydroxy- and alkoxyalkyl phenyl ketones, and thioalkylphenyl morpholinoalkyl ketones. The photoinitiator can be a benzoin ether photoinitiators. Specific exemplary photoinitiators include bis(2,4,6-trimethylbenzoyl)-phenylphosphine oxide supplied as IRGACURE 819 by Ciba, 2-hydroxy-2-methyl-1-phenyl-1-propanone supplied as ADDITOL HDMAP by Allnex, 1-hydroxy-cyclohexyl-phenyl-ketone supplied as IRGACURE 184 by BASF, or 2-hydroxy-2-methyl-1-phenyl-1-propanone supplied as DAROCURE 1173 by BASF. Other exemplary photoinitiators include, but are not limited to, hydroxycyclohexylphenyl ketone, hydroxymethylphenylpropanone, 2-methyl-1-[4-(methylthio)phenyl]-2-morpholinopropanone-1, 1-(4-isopropylphenyl)-2-hydroxy-2-methylpropan-1-one, 1-(4-dodecylphenyl)-2-hydroxy-2-methylpropan-1-one, 4-(2-hydroxyethoxy) phenyl-(2-hydroxy-2-propyl) ketone, 2,2-dimethoxy-2-phenylacetophenone, diethoxyacetophenone, 2,2-di-sec-butoxyacetophenone, diethoxy-phenyl acetophenone, bis(2,6-dimethoxybenzoyl)(2,4,4-trimethylpentyl) phosphine oxide, 2,4,6-trimethylbenzoyldiphenylphosphine oxide, ethyl (2,4,6-trimethylbenzoyl) phenylphosphinate, or the like, or a combination thereof.

The polymerization initiator can be a peroxide, a hydroperoxide, or an azo radical initiator. Exemplary peroxide and hydroperoxide initiators include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethyl-hexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, dicumyl peroxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, or the like, or a combination thereof. Exemplary azo initiators include 2,2'-azo-bis(isobutyronitrile) (AIBN), 1,1'-azo-bis(cyclohexane-1-carbonitrile), 2,2'-azo-bis(2-methylpropionitrile), or the like, or a combination thereof. The polymerization initiator can be a redox initiator such as benzoyl peroxide/N,N-dimethylaniline, hydrogen peroxide/ferrous salt, persulfate/sodium sulfite, peroxide/ascorbic acid, persulfate/ascorbic acid, bisulfite/peroxide, bisulfite/hydroperoxide, cumene hydroperoxide/ferrous salt, peroxide/organic or metal alkyl (triethyl ammonium, triethyl boron, diethyl zinc, or the like), hydroperoxide/organic or metal alkyl, oxygen/organic or metal alkyl, or the like, or a combination thereof.

The curable composition can optionally include a solvent or volatile diluent. Exemplary solvents include water, an organic solvent, or a combination thereof. Exemplary organic solvents include, but are not limited to, acetone, methyl ethyl ketone, ethyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetyl acetone, cyclohexanone, cyclopentanone, diacetone alcohol, ethylene glycol monomethyl ether acetate, ethylene glycol ethyl ether acetate, ethylene glycol monoisopropyl ether, ethylene glycol monobutyl ether acetate, 3-methoxypropanol, methoxyethoxy ethanol, methoxymethoxy ethanol, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 3-methoxypropyl acetate, N,N-dimethylformamide, dimethyl sulfoxide, γ-butyrolactone, butyl acetate, cyclohexyl acetate, methyl lactate, ethyl lactate, methyl 3-ethoxypropionate, ethyl 3-ethoxypropionate, ethyl cellosolve acetate, methyl 3-methoxypropionate, 2-heptanone, ethyl carbitol acetate, butyl carbitol acetate, dichloromethane, 3-methoxy-N,N-dimethyl propenamide, 3-butoxy-N,N-dimethyl propenamide, or the like, or a combination thereof. The curable composition can include a solvent in an amount of 0 to 70 wt %, preferably 1 to 70 wt %, more preferably 5 to 70 wt % based on the total weight of the curable composition.

Fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well a combination thereof. The fillers and reinforcing agents can be coated with a layer of metallic material to facilitate conductivity, or surface treated with silanes to improve adhesion and dispersion with the polymer matrix.

Plasticizers include phthalate esters such as dibutyl phthalate, butyl benzyl phthalate or dioctyl phthalate, di-isononyl phthalate, phosphate triesters such as tricresyl or tris(isopropyl)phenyl phosphate, or chlorinated paraffins or sulphonamides such as N-substituted toluene sulphonamide.

Light stabilizers, in particular UV absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or a combination thereof. The UV stabilizers can be present in an amount of 0.01 to 1 wt %, preferably, 0.1 to 0.5 wt %, and more preferably, 0.15 to 0.4 wt %, based on the total weight of the curable composition.

Thickeners and anti-settling agents (e.g., thixotropic agents) include colloidal silica, hydrated aluminum silicate (bentonite), aluminum tristearate, aluminum monostearate, xanthan gum, chrysotile, pyrogenic silica, hydrogenated castor oil, organo-modified clays, polyamide waxes, and polyethylene waxes.

Antioxidants include organophosphites such as tris(nonyl phenyl)phosphite, tris(2,4-di-t-butylphenyl)phosphite, bis (2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or a combination thereof.

Pigments can include inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or a combination thereof. Preferably, the pigment is non-leaching, non-bactericidal, or both.

Dyes can include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_2$-8) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene; triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2;

7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or a combination thereof. Preferably, the dye is non-leaching, non-bactericidal, or both.

The curable composition can optionally include an ionic acrylate monomer that does not include a metal. Exemplary ionic acrylate monomers include quaternary or acid salts of dialkylaminoalkyl (meth)acrylates; quaternary or acid salts of dialkylaminoalkyl (meth)acrylamides; N,N-diallyldialkyl ammonium halides, and Mannich products. In the foregoing monomers, each alkyl group is independently $C_{1-12}$ alkyl or $C_{1-4}$ alkyl. For example, the ionic acrylate monomer can be N,N-dimethylaminoethylacrylate; diallyldimethylammonium chloride; (3-methacryloylamido)propyl trimethylammonium halide; (3-acryloylamido)propyl trimethylammonium halide; (3-methacryloylamido)propyl trimethylammonium sulfonate, (3-acryloylamido)propyl trimethylammonium sulfonate, (3-methacryloyl)propyl trimethylammonium sulfonate, (3-acryloyl)propyl trimethylammonium sulfonate, wherein each sulfonate salt is, for example, an alkyl, aryl- or arylalkyl-sulfonate salt, such as a dodecylbenzene sulfonate salt. In an aspect, the curable composition does not include a monomer having a quaternary ammonium group.

The curable composition can be used as part of a coating system that includes a surface primer in addition to the curable composition. A series of primers and a filler can be used depending on the condition of the substrate (e.g., a marine structure) to be coated. For example, a rough or dented surface can be prepared using a primer followed by a filler and sanding before applying another compatible primer, and then followed by a top coat of the curable composition. The sequence of application steps and selection of appropriate coating layers can be determined based on the substrate and its condition.

For example, the coating system can include a primer or adhesion-promoting coating (i.e., a tie coat or undercoat) that is applied to the substrate before applying the curable composition. The adhesive or tie layer can include a polymeric adhesive, such as a thermoplastic adhesive, a thermoset adhesive, an elastomeric adhesive, an alloy adhesive, a non-polymeric adhesive, or a combination thereof. Exemplary adhesives include a cellulosic adhesive, a cyanoacrylate adhesive, a dextrin adhesive, an ethylene-vinyl acetate copolymer adhesive, a melamine formaldehyde adhesive, a natural rubber adhesive, a neoprene/phenolic adhesive, a neoprene rubber adhesive, a nitrile rubber adhesive, a nitrile/phenolic adhesive, a phenolic adhesive, a phenol/resorcinol formaldehyde adhesive, a phenoxy adhesive, a polyamide adhesive, a polybenzimidazole adhesive, a polyethylene adhesive, a polyester adhesive, a polyimide adhesive, a polyisobutylene adhesive, a polysulfide adhesive, a polyurethane adhesive, a polyvinyl acetal adhesive, a polyvinyl acetal/phenolic adhesive, a polyvinyl acetate adhesive, a polyvinyl alcohol adhesive, a reclaimed rubber adhesive, a resorcinol adhesive, a silicone adhesive, a styrenic TPE adhesive, a styrene butadiene adhesive, a vinyl phenolic adhesive, a vinyl vinylidene adhesive, an acrylic acid diester adhesive, an epoxy adhesive, an epoxy/phenolic adhesive, an epoxy/polysulfide adhesive, a urea formaldehyde adhesive, a urea formaldehyde/melamine formaldehyde adhesive, a urea formaldehyde/phenol resorcinol adhesive, or a combination thereof. Exemplary thermosetting adhesives include an acrylic adhesive, an acrylic acid diester adhesive, a cyanoacrylate adhesive, a cyanate ester adhesive, an epoxy adhesive, a melamine formaldehyde adhesive, a phenolic adhesive, a polybenzimidazole adhesive, a polyester adhesive, a polyimide adhesive, a polyurethane adhesive, a resorcinol adhesive, a urea formaldehyde adhesive, or a combination thereof. Exemplary thermoplastic adhesives include an acrylic adhesive, an ethylene-vinyl acetate copolymer adhesive, a carbohydrate adhesive (e.g., a dextrin adhesive, a starch adhesive), a cellulosic adhesive (e.g., a cellulose acetate adhesive, cellulose acetate butyrate adhesive, cellulose nitrate adhesive), a polyethylene adhesive, a phenoxy adhesive, a polyamide adhesive, a polyvinyl acetal adhesive, a polyvinyl acetate adhesive, a polyvinyl alcohol adhesive, a protein adhesive (e.g., an animal adhesive, a soybean adhesive, a blood adhesive, a fish adhesive, a casein adhesive), a vinyl vinylidene adhesive, or a combination thereof. Exemplary elastomeric adhesives include a butyl rubber adhesive, a natural rubber adhesive, a neoprene rubber adhesive, a nitrile rubber adhesive, a polyisobutylene adhesive, a polysulfide adhesive, a reclaimed rubber adhesive, a silicone adhesive, a styrenic TPE adhesive, a styrene butadiene adhesive, or a combination thereof. Exemplary alloy adhesives include an epoxy/polyamide adhesive, an epoxy/phenolic adhesive, an epoxy/polysulfide adhesive, a neoprene/phenolic adhesive, a nitrile/phenolic adhesive, a phenol/resorcinol formaldehyde adhesive, a polyvinyl acetal/phenolic adhesive, a vinyl/phenolic adhesive, a urea formaldehyde/phenol resorcinol adhesive, a urea formaldehyde/melamine formaldehyde adhesive, or a combination thereof. For example, the adhesion promoting coating can include a polyurethane, an epoxy resin, an epoxy polysiloxane, a natural or synthetic rubber that is optionally chlorinated such as chloroprene and neoprene, or a silicone elastomer such as butyral-silicone rubber.

Also provided is a method of inhibiting biofilm formation on a substrate. The method includes applying the curable composition to a surface of the substrate and curing the curable composition to form an anti-fouling coating on the surface of the substrate. The resulting anti-fouling coating comprises the polymeric compound, wherein a backbone of the polymeric compound is covalently bonded to a quorum sensing inhibitor, as described herein.

The anti-fouling coating can be obtained by applying the curable composition to the surface of a substrate, such as by applying the curable composition to the surface of the substrate to form a coated substrate. For example, curable composition can be applied by spray coating, dip coating, brushing, roller coating, curtain coating, spin coating, flow coating, soaking, electrografting, or a combination thereof. Preferably, the curable composition is applied by brushing, roller coating, dipping, or spraying. The solvent or diluent carrier, if any, can be removed by evaporation after the curable composition has been applied to the substrate.

The coated substrate including the curable composition can be cured to provide the anti-fouling coating. Any method for curing can be used, for example by heating at an effective temperature, irradiation with actinic radiation at an effective wavelength, or a combination thereof. For example, the curable compositions can be cured by subjecting to thermal curing, photocuring such as UV curing, electron-beam curing, or a combination thereof. In an aspect, the curing includes both UV curing and thermal curing. UV curing can be performed in the UVA spectrum (320-400 nanometers), the UVB spectrum (290-320 nanometers), the UVC spectrum (100-290 nanometers), or overlapping wavelengths therein.

Thermal curing can be achieved using any conditions. For example, the curable composition can be cured at a temperature of 20 to 130° C., preferably 25 to 100° C. The curing time can be 30 seconds to 24 hours, preferably 0.1 minute to 10 hours, more preferably 2 minutes to 5 hours. The curing can be staged to produce a partially cured and often tack-free composition, which then can be fully cured by heating or irradiating for longer periods or temperatures within the aforementioned ranges.

The curable compositions can be cured by photocuring, for example by irradiation, such as at a wavelength of 180 to 400 nanometers (nm). The lamp system used to generate such radiation include ultraviolet lamps and discharge lamps, for example, xenon, metallic halide, metallic arc, low or high pressure mercury vapor discharge lamps, or the like. Photocuring is meant to include both polymerization and cross-linking processes.

The polymeric compound can have a weight average molecular weight of 1,000 to 200,000 grams per mole (g/mol), as determined by gel permeation chromatograph (GPC). For example, the polymeric compound can have a weight average molecular weight of 1,000 to 100,000 g/mol, preferably 1,000 to 60,000 g/mol, more preferably 1,000 to 40,000 g/mol, even more preferably 1,000 to 25,000 g/mol.

As described above, the curable composition can be applied directly to a non-treated substrate. Alternatively, the curable composition can be applied to a substrate to which surface treatments or other coating layers have been previously applied. Examples of such surface treatments and other coating layers include anticorrosion coatings, bactericidal anti-fouling coatings, sealer coats, tie-coats, adhesion promoting coatings, or the like, or a combination thereof. For example, an anti-corrosion coating, a sealer coating, a primer coating, a tie coating, an adhesion-promoting coating, or a combination thereof can be applied to the surface of the substrate before applying the curable composition.

The anti-fouling coating can be disposed on the surface of the substrate having a thickness that effective to provide QSI. For example, the anti-fouling coating can have a thickness of 5 to 5,000 micrometers (μm). For example, the anti-fouling coating can have a thickness of 100 to 3,000 μm, preferably 500 to 2,500 μm, more preferably 750 to 2,000 μm, even more preferably 1,000 to 2,000 μm. The thickness of the film described herein means the average thickness as measured from the surface of the substrate and refers to the thickness of the cured coating.

For application to ship and boat hulls at newbuilding, the curable composition can be applied directly over a substrate having one or more anticorrosive coatings. At maintenance and repair or recoat, the curable composition can be applied optionally over the existing coating scheme (with optional link coat) or directly over the substrate after removal of the existing coating scheme and reapplication of one or more anticorrosive coatings.

The substrate to be coated is preferably a marine structure, for example comprising a metal, an alloy, a thermoplastic, a thermoset resin, a wood, a fiber, or a combination thereof. In other words, the substrate can be a metal, an alloy, a thermoplastic, a thermoset resin, a wood, a fiber, or a combination thereof that is used as a marine structure.

Exemplary marine structures include, but are not limited to, a ship hull, a propeller, a rudder, a keel, a centerboard, a fin, a hydrofoil, a deck surface, a buoy, a pier, a wharf, a jetty, a fishing net, a cooling system surface, a cooling water intake or discharge pipe, a nautical beacon, a floating beacon, a floating breakwater, a dock, a pipeline, a tank, a bridge, a bell, a plumb, a dredge, a pump, a valve, a rope, a ladder, a pontoon, an antenna, a periscope, a snorkel, a gun mount, a gun barrel, a launch tube, a mine, a torpedo, or a depth charge. Other exemplary substrates include fish nets, fish cages, and fabrics.

The anti-fouling coatings are not limited to use with marine structures. For example, the anti-fouling coating can be disposed on a medical device or instrument to provide QSI properties. The anti-fouling coating can be the same as described above, optionally incorporating other QSI compounds that are specific to infectious bacteria, such as *Escherichia coli, Enterococcus faecalis, Candida albicans, Enterobacter aerogenes, Staphylococcus epidermidis, Streptococcus mitis, Proteus mirabilis, Pseudomonas aeruginosa, Klebsiella pneumonia, Citrobacter feundii*, or the like, or a combination thereof. Exemplary substrates include, but are not limited to, catheters, endoscopes, syringes and needles, external fixators, implants, valves, vascular grafts, prostheses, or the like.

As described herein, the polymeric compound can be prepared directly from a curable composition including one or more monomers having a polymerizable functional group and a QSI group. Alternatively, the polymeric compound can be prepared by first forming a polymeric compound having at least one pendant reactive functional group, and then reacting an appropriately functionalized QSI compound with the reactive pendant group to provide the at least one pendant QSI covalently bonded to the polymeric backbone. For example, the polymeric compound can be prepared from one or more polymerizable monomers having a reactive functional group that does not participate in the polymerization reaction. The resultant pendant reactive functional group can be for example a carboxylic acid group or a salt thereof, a hydroxyl group or a salt thereof, an amino group, or the like. The functionalized QSI compound can include a functionality that is amenable to reaction with the pendant reactive functional group, using reaction conditions effective to form the pendant QSI. The structure of the resulting polymeric compound can be the same as the structure of the polymeric compound that is prepared from the curable composition.

This disclosure is further illustrated by the following examples, which are non-limiting.

EXAMPLES

The components listed in Table 1 were used for the examples.

TABLE 1

| Compound | Description | Source |
| --- | --- | --- |
| HEMA | 2-Hydroxyethyl methacrylate | Sigma |
| PEGDA 700 | Poly(ethylene glycol) diacrylate), $M_n$ of 700 g/mol (GPC) | Sigma |
| DMPA | 2,2-Dimethoxy-2-phenylacetophenone | Sigma |
| Gallic Acid | Gallic acid monohydrate | Sigma |
| EDCl | N-(3-Dimethylaminopropyl)-N'-ethylcarbodiimide hydrochloride | Oakwood |
| DMAP | 4-(Dimethylamino)pyridine | Sigma |
| PI | Bis(2,4,6-trimethylbenzoyl)phenylphosphine oxide (available as IRGACURE 819) | Ciba |

Preparation of Surface Modified Glass Slides

Glass slides (length of 75 millimeters (mm), width of 25 mm, obtained from Fisher Scientific) were treated with a UV-Plasma for 10 minutes. The treated glass slides were held for 24 hours in a solution of ethanol (100 milliliter (mL)), deionized water (5 mL), 3-(trimethoxysilyl)propyl methacrylate (10 mL), and acetic acid (0.02 mL of a 99.8% solution). The resulting surface modified glass slides were washed with ethanol and dried at 22° C. for 20 minutes.

Marine Broth Preparation

A glycerol stock solution of *Sulfitobacter* sp. (obtained as ATCC BAA-1142 from American Type Culture Collection) was plated onto a prepared marine agar plate and incubated at 25° C. for 72 hours. The marine agar material was prepared from a dehydrated marine agar (BD Difco Dehydrated Culture Media: Marine Agar 2216, obtained from Fisher Scientific) by dissolving in 1 liter (L) of deionized water (resistivity of 18 megaohm centimeter (MΩ·cm)) and was subsequently autoclaved at 121° C. The content of the marine agar solution (per liter) was peptone (5.0 g), yeast extract (1.0 g), ferric citrate (0.1 g), sodium chloride (19.45 g), magnesium chloride (8.8 g), sodium sulfate (3.24 g), calcium chloride (1.8 g), potassium chloride (0.55 g), sodium bicarbonate (0.16 g), potassium bromide (0.08 g), strontium chloride (34.0 mg), boric acid (22.0 mg), sodium silicate (4.0 mg), sodium fluoride (2.4 mg), ammonium nitrate (1.6 mg), disodium phosphate (8.0 mg), and agar (15.0 g).

An isolated colony of the bacteria was inoculated into 5.0 mL of a marine broth prepared from the dehydrated marine agar at 25° C. for 24 hours. The marine broth had a pH of 7.96. The resulting culture was diluted with deionized water to provide a bacterium count of $6 \times 10^6$ colony forming units per mL (CFU/mL) as a stock solution of an enriched marine broth inoculated with *Sulfitobacter* sp.

Fluorescent Microscopy

Glass slides were held for 5 minutes in a 1% solution of Congo Red as prepared from 500 mg of Congo Red, 47.5 mL of 0.15 molar (M) sodium chloride, and 2.5 mL of 0.1 M of monobasic potassium phosphate. The stained glass slides were removed from the solution and excess Congo Red was displaced by dipping the stained glass slides into a water bath (4 times). The stained glass slides were air dried at 23° C. Fluorescent microscope images were obtained with a Nikon Ni-E Microscope at 20× resolution with a TRITC bandpass filter.

Example 1

A HEMA-PEG-Gallate copolymer was prepared by combining 2 mL of a QSI-containing monomer of formula (1a), 10 milligram (mg) of DMPA, and 100 mg of PEGDA 700 to form a reaction mixture. The reaction mixture was applied to surface modified glass slides by pipette, the coated surface was covered with a second glass slide to maintain a constant thickness, and polymerization was achieved using UVA light having an irradiance of about 0.001 watt per square centimeter ($W/cm^2$) for 1 minute to provide a HEMA-PEG-Gallate copolymer coating on the glass slides.

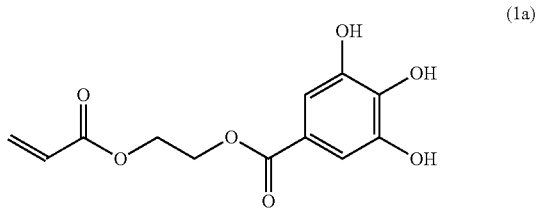 [SMILES: C=CC(=O)OCCOC(=O)c1cc(O)c(O)c(O)c1]

(1a)

Comparative Example 1

A surface modified glass slide was covered with a second glass slide to prepare a control sample. The samples did not contain a copolymer coating.

Comparative Example 2

HEMA was combined with 50 mg of DMPA and 100 mg of PEGDA 700 to form a reaction mixture. The reaction mixture was applied to surface modified glass slides by pipette, the coated surface was covered with a second glass slide to maintain a constant thickness, and polymerization was achieved using UVA light having an irradiance of about 0.001 $W/cm^2$ for 2 minutes to provide a HEMA-PEG copolymer coating on the glass slides.

Example 2

Biofilm culturing of the glass slides of Example 1, Comparative Example 1, and Comparative Example 2 was performed using a Drip Flow Biofilm Reactor (model DRF-110-6, available from BioSurface Technologies Corp.; Bozeman, Mont.) with a continuous flow of the enriched marine broth inoculated with *Sulfitobacter* sp. at 22° C. for 48 hours (pH of 7-8). The resulting glass slides were examined by fluorescent microscopy to determine the extent of *Sulfitobacter* sp. biofilm growth. As shown in FIG. 1A, extensive biofilm formation (87.8% biofilm coverage) was observed in the fluorescent microscope image of Comparative Example 1. FIG. 1B shows the fluorescent microscope image of Comparative Example 2 and reveals the extent of biofilm growth in the absence of a QSI copolymer (64.1% biofilm coverage). FIG. 1C shows the fluorescent microscope image of Example 1 and shows a decreased amount of biofilm growth (47.9% biofilm coverage). These results show the anti-fouling coating that includes the QSI decreases the amount of biofouling by about 25% compared to the coated sample of Comparative Example 2 and by about 45% compared to the uncoated sample of Comparative Example 1.

Example 3

A HEMA-PEG-Gallate copolymer was prepared by combining gallic acid (3.13 g, 18.4 mmol), HEMA (24.3 g, 187 mmol), DMAP (0.246 g, 2.01 mmol), and EDCl (4.56 g, 23.8 mmol) to form a reaction mixture. To the reaction mixture was added 0.201 g of PEGDA 700 and 0.04 g of PI. The copolymer was heated at 65° C. for 12 hours and then purified with an aqueous workup. The resulting product was combined with 0.29 g of PEGDA and 0.058 g of PI as a photoinitiator and agitated until the components were dissolved to form a coating mixture. The coating mixture (0.8-1 g) was applied to surface modified glass slides by pipette, and the coating was covered with polytetrafluorethylene tape to achieve a thickness of either 0.55 mm (thin coat) or 1.39 mm (thick coat). The coatings were cured using a UVA light having an irradiance of about 0.001 watt per square centimeter $W/cm^2$ for 5 minutes to provide coated glass slides having a HEMA-PEG-Gallate copolymer coating. The resulting coated glass slides were sanitized for 30 minutes by continuous washing with a solution of 70% isopropanol prior to bacterial exposure.

The coated glass slides were disposed in reaction chambers and each chamber was incubated for 7 hours with 15 mL of the stock solution of the enriched marine broth inoculated with *Sulfitobacter* sp. The reaction chambers were removed and inserted into a Drip Flow Biofilm Reactor and subjected to a continuous flow of the enriched marine broth for about 18 hours. The coated glass slides were then prepared for fluorescence imaging as described above.

Figure 2A:
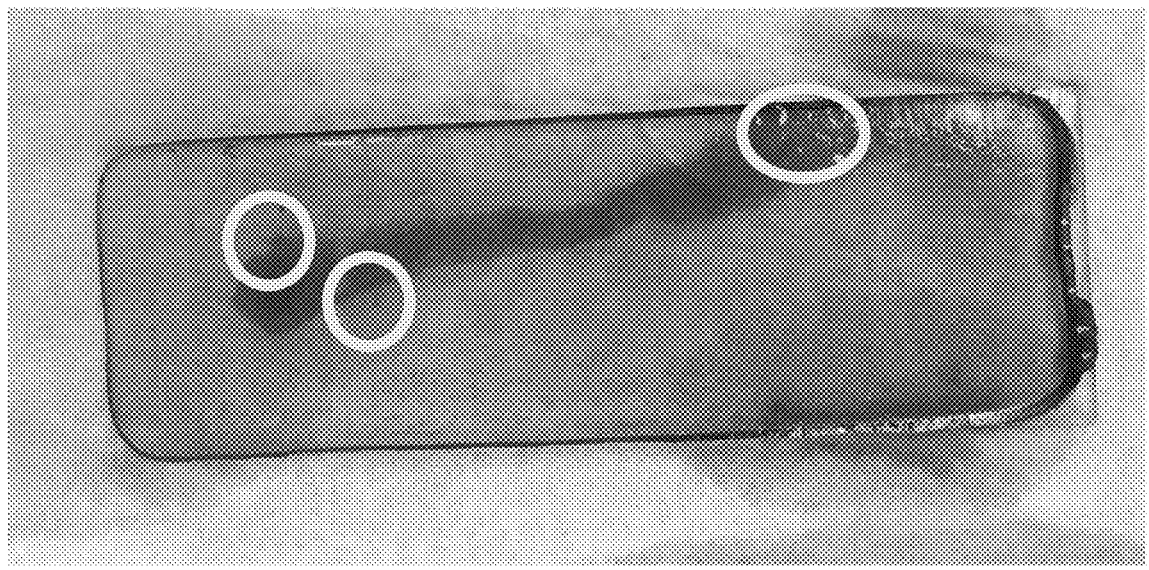
Figure 3B:
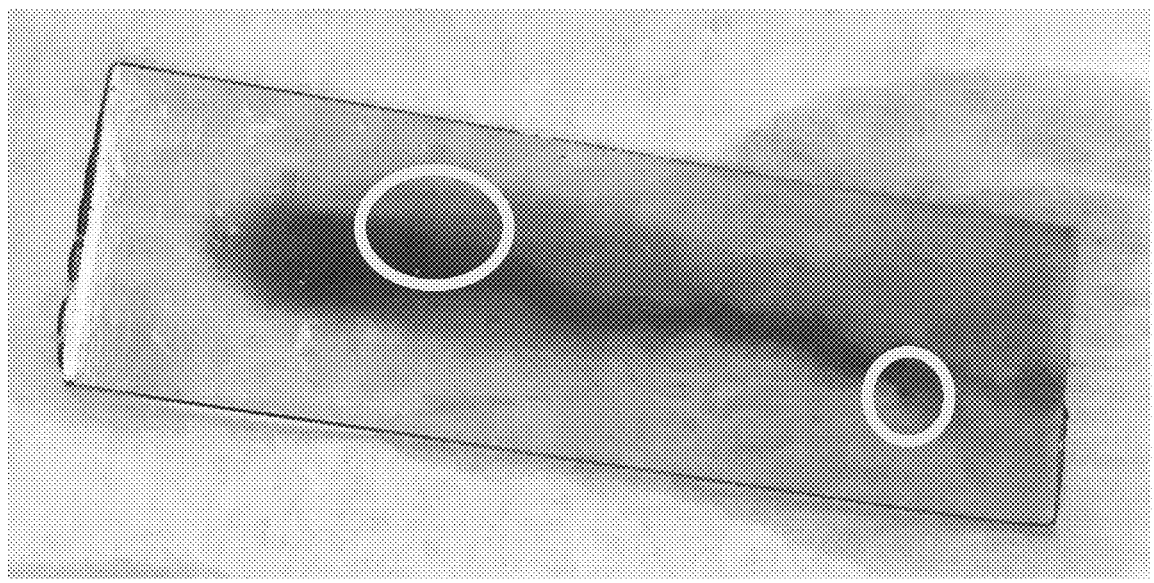
FIGS. 3A and 3B are photographic images of glass slides with thin anti-fouling coatings according to one or more aspects of Example 3.
Figure 3A:
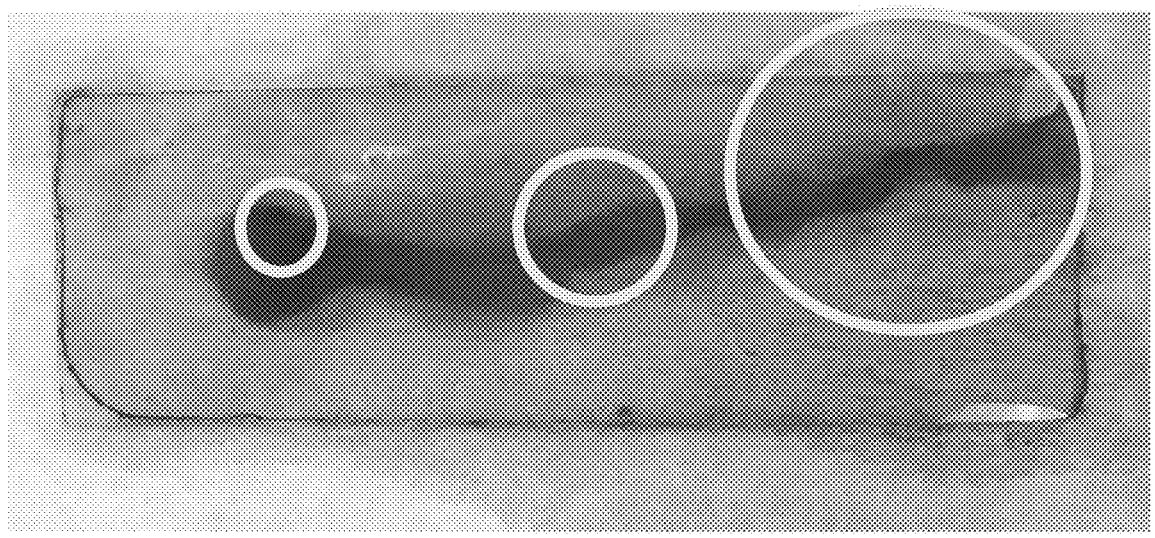

The samples were examined by fluorescent microscopy to determine the extent of *Sulfitobacter* sp. biofilm growth. FIGS. 2A and 2B show the photographic images for the samples having the thick coat and FIGS. 3A and 3B show the photographic microscope images for the samples having the thin coat. The images reveal that less biofilm formation is achieved when the anti-fouling coating has a thickness of 1.39 mm. These results show that the anti-fouling coating can inhibit the formation of a biofilm based on the thickness of the anti-fouling coating.

This disclosure further encompasses the following aspects.

Aspect 1. An anti-fouling coating comprising a polymeric compound, wherein a backbone of the polymeric compound is covalently bonded to a quorum sensing inhibitor, and wherein the anti-fouling coating has substantially no bactericidal activity, the quorum sensing inhibitor is substantially non-leaching from the anti-fouling coating, or a combination thereof.

Aspect 2. The anti-fouling coating of aspect 1, wherein the quorum sensing inhibitor is a gallic acid group, a pyrogallol group, a catechol group, an ellagic acid group, a kojic acid group, a resveratrol group, a chrysin group, an apigenin group, a quercetin group, a baicalein group, a diydroxyflavone group, a trihydroxyflavone group, a naringenin group, a phloretin group, a pinocembrin group, a 4-nitropyridine-N-oxide group, a furanone group, a thiazolidinedione group, an aminobenzene sulfonamide group, a nitrobenzene sulfonamide group, an N-acyl homoserine lactone group, a demethoxyencecalin group, or a combination thereof.

Aspect 3. The anti-fouling coating of aspect 1, wherein the polymeric compound comprises 0.1 to 99 weight percent of structural units comprising the quorum sensing inhibitor, based on the total weight of structural units in the polymeric compound being 100 weight percent.

Aspect 4. The anti-fouling coating of aspect 1, wherein the polymeric compound comprises structural units derived from: a first monomer of formula (1) and optionally a second monomer of formula (2), wherein the structures of formula (1) and formula (2) are as provided herein.

Aspect 5. The anti-fouling coating of aspect 4, wherein each polymerizable group is independently (meth)acrylate, glycidyl ether, N-vinyl, vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl.

Aspect 6. The anti-fouling coating of aspect 5, wherein $R^1$ and $R^2$ are each independently (meth)acrylate, (meth)acrylamide, itaconic acid, norbornene, vinylsilane, alkoxysilane, halosilane, vinylester, vinylether, or vinylamide; $R^3$ is hydrogen, halide, hydroxy, amino, thiol, or the second polymerizable group; each occurrence of $L^1$ is independently $C_{1-6}$ alkylene, —C(O)—, —O—, or —N($R^{11}$)—; each occurrence of $L^2$ is independently $C_{1-6}$ alkylene, —C(O)—, —O—, or —N($R^{11}$)—; $R^{11}$ is hydrogen, $C_{1-6}$ alkyl, $C_{2-6}$ alkoxyalkyl, $C_{7-13}$ aryloxyalkyl, $C_{7-13}$ arylalkyl, or $C_{7-13}$ alkylaryl; and m and n are each independently 1 to 100.

Aspect 7. A curable composition comprising: a first monomer of formula (1) and optionally a second monomer of formula (2), wherein the structures of formula (1) and formula (2) are as provided herein.

Aspect 8. The curable composition of aspect 7, wherein the quorum sensing inhibitor is a galloyl group, a pyrogallol group, a catechol group, an ellagic acid group, a kojic acid group, a quercetin group, a resveratrol group, a chrysin group, an apigenin group, a baicalein group, a diydroxyflavone group, a trihydroxyflavone group, naringenin group, a phloretin group, a pinocembrin group, a 4-nitropyridine-N-oxide group, a furanone group, a thiazolidinedione group, an aminobenzene sulfonamide group, a nitrobenzene sulfonamide group, an N-acyl homoserine lactone group, demethoxyencecalin group, or a combination thereof.

Aspect 9. The curable composition of aspect 7, wherein each polymerizable group is independently (meth)acrylate, glycidyl ether, N-vinyl, vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl.

Aspect 10. The curable composition of aspect 7, wherein the curable composition comprises, based on the total weight of monomers in the curable composition being 100 weight percent, 0.1 to 99 weight percent of the first monomer; 1 to 70 weight percent of the second monomer; and 0 to 35 weight percent of a third monomer, wherein the third monomer has the structure of formula (2) wherein $R^3$ is a polymerizable group, and the second monomer is different from the third monomer.

Aspect 11. The anti-fouling coating of aspect 7, wherein the curable composition further comprises an adhesion promoter, a crosslinking agent, a polymerization initiator, or a combination thereof.

Aspect 12. A method of inhibiting biofilm formation on a substrate, the method comprising: applying a curable composition to a surface of the substrate; and curing the curable composition to form an anti-fouling coating on the surface of the substrate, wherein the anti-fouling coating comprises a polymeric compound, wherein a backbone of the polymeric compound is covalently bonded to a quorum sensing inhibitor, and wherein the anti-fouling coating has substantially no bactericidal activity, the quorum sensing inhibitor is substantially non-leaching from the anti-fouling coating, or a combination thereof.

Aspect 12a. The method of aspect 12, further comprising contacting the anti-fouling coating to a marine environment, wherein the anti-fouling coating has substantially no bactericidal activity to the marine environment, the quorum sensing inhibitor is substantially non-leaching from the anti-fouling coating in the marine environment, or a combination thereof.

Aspect 13. The method of aspect 12, wherein the applying is spray coating, dip coating, brushing, roller coating, curtain coating, spin coating, flow coating, soaking, electrografting, or a combination thereof.

Aspect 14. The method of aspect 12, wherein the curing comprises heating at an effective temperature, irradiation with actinic radiation at an effective wavelength, or a combination thereof.

Aspect 15. The method of aspect 12, further comprising applying an anti-corrosion coating, a sealer coating, a primer coating, a tie coating, an adhesion-promoting coating, or a combination thereof to the surface of the substrate before the applying of the curable composition.

Aspect 16. The method of aspect 12, wherein the curable composition is applied to the surface of the substrate in an amount effective to inhibit the formation of a biofilm on the surface of the substrate.

Aspect 17. The method of aspect 12, wherein the antifouling coating has a thickness of 5 to 5,000 micrometers.

Aspect 18. The method of aspect 12, wherein the curable composition comprises a first monomer of formula (1), optionally a second monomer of formula (2), and optionally an adhesion promoter, a crosslinking agent, a polymerization initiator, or a combination thereof, wherein the structures of formula (1) and formula (2) are as provided herein.

Aspect 19. The method of aspect 12, wherein the substrate is a marine structure comprising a metal, an alloy, a thermoplastic, a thermoset resin, a wood, a fiber, or a combination thereof.

Aspect 20. The method of aspect 19, wherein the marine structure is a ship hull, a propeller, a rudder, a keel, a centerboard, a fin, a hydrofoil, a deck surface, a buoy, a pier, a wharf, a jetty, a fishing net, a cooling system surface, a cooling water intake or discharge pipe, a nautical beacon, a floating beacon, a floating breakwater, a dock, a pipeline, a tank, a bridge, a bell, a plumb, a dredge, a pump, a valve, a rope, a ladder, a pontoon, an antenna, a periscope, a snorkel, a gun mount, a gun barrel, a launch tube, a mine, a torpedo, or a depth charge.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combinations" is inclusive of blends, mixtures, alloys, reaction products, and the like. The terms "first," "second," and the like, do not denote any order, quantity, or importance, but are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. The suffix "(s)" is intended to include both the singular and the plural of the term that it modifies, thereby including at least one of that term (e.g., the colorant(s) includes at least one colorant). A "combination thereof" is open and includes any combination comprising at least one of the listed components or properties optionally together with a like or equivalent component or property not listed. "Each independently" as used herein means that the named variables can independently be the same or different.

Reference to "some aspects," "an aspect," and so forth, means that a particular element described in connection with the aspect is included in at least one aspect described herein, and may or may not be present in other aspects. In addition, it is to be understood that the described elements can be combined in any suitable manner in the various aspects. "Optional" or "optionally" means that the subsequently described component, event, or circumstance may or may not be present or occur, and that the description includes instances where the component, event, or circumstance is present or occurs and instances where it does not.

Unless defined otherwise, technical and scientific terms used herein have the same meaning as is understood by one of skill in the art to which this disclosure belongs. However, if a term in the present application contradicts or conflicts with a term in the incorporated reference, the term from the present application takes precedence over the conflicting term from the incorporated reference. All cited patents, patent applications, and other references are incorporated herein by reference in their entirety. Unless specified to the contrary herein, all test standards are the most recent standard in effect as of the filing date of this application, or, if priority is claimed, the filing date of the earliest priority application in which the test standard appears.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); "alkenyloxy" refers to an alkenyl group attached through an oxygen bridge; "arylalkoxy" refers to an alkoxy group that has been substituted with an aryl group; "aryloxy" refers to an aryl group as defined above with the indicated number of carbon atoms attached through an oxygen bridge (—O—); "aryloxyalkyl" refers to an alkyl group that has been substituted with an aryloxy group; "alkylaryloxy" refers to an aryloxy group that has been substituted with an alkyl group. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. The "(meth)acryl" prefix includes both methacryl and acryl, the "(meth)allyl" prefix includes both methallyl and allyl, and the "(meth)acrylamide" prefix includes both methacrylamide and acrylamide.

Unless substituents are otherwise indicated, each of the foregoing groups can be unsubstituted or substituted, provided that the substitution does not significantly adversely affect synthesis, stability, or use of the compound. The term "substituted" as means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible. Exemplary groups that can be present on a "substituted" position include, but are not limited to, nitro (—$NO_2$), cyano (—CN), hydroxy (—OH), amino (—$NH_2$), mono- or di-($C_{1-6}$)alkylamino, alkanoyl (such as a $C_{2-6}$ alkanoyl group such as acyl), formyl (—C(=O)H), carboxylic acid or an alkali metal or ammonium salt thereof, $C_{2-6}$ alkyl ester (—C(=O)O-alkyl or —OC(=O)-alkyl), $C_{7-13}$ aryl ester (—C(=O)O-aryl or —OC(=O)-aryl), amido (—C(=O)$NR_2$ wherein R is hydrogen or $C_{1-6}$ alkyl), carboxamido (—$CH_2$C(=O)$NR_2$ wherein R is hydrogen or $C_{1-6}$ alkyl), halogen, thiol (—SH), $C_{1-6}$ alkylthio (—S-alkyl), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl having at least one aromatic ring (e.g., phenyl, biphenyl, naphthyl, or the like, each ring either substituted or unsubstituted aromatic), $C_{7-19}$ arylalkyl having 1 to 3 separate or fused rings and from 6 to 18 ring carbon atoms, arylalkoxy having 1 to 3 separate or fused rings and from 6 to 18 ring carbon atoms, $C_{7-12}$ alkylaryl, $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded. When a compound is substituted, the indicated number of carbon atoms is the total number of carbon atoms in the compound or group, including those of any substituents.

While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An anti-fouling coating comprising a polymeric compound, wherein a backbone of the polymeric compound is covalently bonded to a quorum sensing inhibitor, and
    wherein the anti-fouling coating has substantially no bactericidal activity, the quorum sensing inhibitor is substantially non-leaching from the anti-fouling coating, or a combination thereof.

2. The anti-fouling coating of claim 1, wherein the quorum sensing inhibitor is a gallic acid group, a pyrogallol group, a catechol group, an ellagic acid group, a kojic acid group, a resveratrol group, a chrysin group, an apigenin group, a quercetin group, a baicalein group, a diydroxyflavone group, a trihydroxyflavone group, naringenin group, a phloretin group, a pinocembrin group, a 4-nitropyridine-N-oxide group, a furanone group, a thiazolidinedione group, an aminobenzene sulfonamide group, a nitrobenzene sulfonamide group, an N-acyl homoserine lactone group, a demethoxyencecalin group, or a combination thereof.

3. The anti-fouling coating of claim 1, wherein the polymeric compound comprises 0.1 to 99 weight percent of structural units comprising the quorum sensing inhibitor, based on a total weight of structural units in the polymeric compound being 100 weight percent.

4. The anti-fouling coating of claim 1, wherein the polymeric compound comprises structural units derived from:
    a first monomer of formula (1)

$$R\text{-}(L^1)_m\text{-}Q \quad (1);\text{ and}$$

optionally a second monomer of formula (2)

$$R^2\text{-}(L^2)_n\text{-}R^3 \quad (2),$$

wherein, in formulae (1) and (2),
    $R^1$ and $R^2$ are each independently a polymerizable group;
    $R^3$ is hydrogen, halide, hydroxy, amino, thiol, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)$R^4$, —OC(O)$R^5$, —C(O)O$R^6$, —C(O)N($R^7$)($R^8$), —N($R^9$)($R^1$), or a second polymerizable group;
    each occurrence of $L^1$ is independently $C_{1-12}$ alkylene, $C_{2-12}$ alkenylene, $C_{6-12}$ arylene, —C(O)—, —O—, —N($R^{11}$)—, —S—, —S(O)—, —S(O)$_2$—, or —Si(O)($R^{12}$)($R^{13}$)—;
    each occurrence of $L^2$ is independently $C_{1-12}$ alkylene, $C_{2-12}$ alkenylene, $C_{6-12}$ arylene, —C(O)—, —O—, —N($R^{11}$)—, —S—, —S(O)—, —S(O)$_2$—, or —Si(O)($R^{12}$)($R^{13}$)—;
    $R^4$ to $R^6$ are each independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;
    $R^7$ to $R^{11}$ are each independently hydrogen, $C_{1-12}$ alkyl, $C_{2-12}$ alkoxyalkyl, $C_{2-12}$ alkenyl, $C_{3-8}$ cycloalkyl, $C_{6-14}$ aryl, $C_{7-13}$ aryloxyalkyl, $C_{7-13}$ arylalkyl, or $C_{7-13}$ alkylaryl;
    $R^{12}$ to $R^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl;
    Q is the quorum sensing inhibitor; and
    m and n are each independently 0 to 1,000.

5. The anti-fouling coating of claim 4, wherein each polymerizable group is independently (meth)acrylate, glycidyl ether, N-vinyl, vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl.

6. The anti-fouling coating of claim 5, wherein
    $R^1$ and $R^2$ are each independently (meth)acrylate, (meth)acrylamide, itaconic acid, norbornene, vinylsilane, alkoxysilane, halosilane, vinylester, vinylether, or vinylamide;
    $R^3$ is hydrogen, halide, hydroxy, amino, thiol, or the second polymerizable group;
    each occurrence of $L^1$ is independently $C_{1-6}$ alkylene, —C(O)—, —O—, or —N($R^{11}$)—;
    each occurrence of $L^2$ is independently $C_{1-6}$ alkylene, —C(O)—, —O—, or —N($R^{11}$)—;

$R^{11}$ is hydrogen, $C_{1-6}$ alkyl, $C_{2-6}$ alkoxyalkyl, $C_{7-13}$ aryloxyalkyl, $C_{7-13}$ arylalkyl, or $C_{7-13}$ alkylaryl; and m and n are each independently 1 to 100.

7. A curable composition comprising:
a first monomer of formula (1)

          (1); and optionally a second monomer of formula (2)

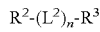          (2), wherein, in formulae (1) and (2),
$R^1$ and $R^2$ are each independently a polymerizable group;
$R^3$ is hydrogen, halide, hydroxy, amino, thiol, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), —N(R$^9$)(R$^1$), or a second polymerizable group;
each occurrence of $L^1$ is independently $C_{1-12}$ alkylene, $C_{2-12}$ alkenylene, $C_{6-12}$ arylene, —C(O)—, —O—, —N(R$^{11}$)—, —S—, —S(O)—, —S(O)$_2$—, or —Si(O)(R$^{12}$)(R$^{13}$)—;
each occurrence of $L^2$ is independently $C_{1-12}$ alkylene, $C_{2-12}$ alkenylene, $C_{6-12}$ arylene, —C(O)—, —O—, —N(R$^{11}$)—, —S—, —S(O)—, —S(O)$_2$—, or —Si(O)(R$^{12}$)(R$^{13}$)—;
$R^4$ to $R^6$ are each independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;
$R^7$ to $R^{11}$ are each independently hydrogen, $C_{1-12}$ alkyl, $C_{2-12}$ alkoxyalkyl, $C_{2-12}$ alkenyl, $C_{3-8}$ cycloalkyl, $C_{6-14}$ aryl, $C_{7-13}$ aryloxyalkyl, $C_{7-13}$ arylalkyl, or $C_{7-13}$ alkylaryl;
$R^{12}$ to $R^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl;
Q is a quorum sensing inhibitor; and
m and n are each independently 0 to 1,000.

8. The curable composition of claim 7, wherein the quorum sensing inhibitor is a galloyl group, a pyrogallol group, a catechol group, an ellagic acid group, a kojic acid group, a quercetin group, a resveratrol group, a chrysin group, an apigenin group, a baicalein group, a diydroxyflavone group, a trihydroxyflavone group, naringenin group, a phloretin group, a pinocembrin group, a 4-nitropyridine-N-oxide group, a furanone group, a thiazolidinedione group, an aminobenzene sulfonamide group, a nitrobenzene sulfonamide group, an N-acyl homoserine lactone group, a demethoxyencecalin group, or a combination thereof.

9. The curable composition of claim 7, wherein each polymerizable group is independently (meth)acrylate, glycidyl ether, N-vinyl, vinylether, vinylester, vinylamide, styrene, (meth)acrylamide, cyanoacrylate, 1,3-diene, vinylcarbonate, vinylcarbamate, maleimide, α-olefin, itaconic acid, norbornene, vinylsilane, alkoxysilane, halosilane, or alkynyl.

10. The curable composition of claim 7, wherein the curable composition comprises, based on a total weight of monomers in the curable composition being 100 weight percent,
0.1 to 99 weight percent of the first monomer;
1 to 70 weight percent of the second monomer; and
0 to 35 weight percent of a third monomer, wherein the third monomer has a structure of the formula (2) wherein $R^3$ is the second polymerizable group, and the second monomer is different from the third monomer.

11. The curable composition of claim 7, wherein the curable composition further comprises an adhesion promoter, a crosslinking agent, a polymerization initiator, or a combination thereof.

12. A method of inhibiting biofilm formation on a substrate, the method comprising:
applying a curable composition to a surface of the substrate; and
curing the curable composition to form an anti-fouling coating on the surface of the substrate,
wherein the anti-fouling coating comprises a polymeric compound, wherein a backbone of the polymeric compound is covalently bonded to a quorum sensing inhibitor, and
wherein the anti-fouling coating has substantially no bactericidal activity, the quorum sensing inhibitor is substantially non-leaching from the anti-fouling coating, or a combination thereof.

13. The method of claim 12, wherein the applying is spray coating, dip coating, brushing, roller coating, curtain coating, spin coating, flow coating, soaking, electrografting, or a combination thereof.

14. The method of claim 12, wherein the curing comprises heating at an effective temperature, irradiation with actinic radiation at an effective wavelength, or a combination thereof.

15. The method of claim 12, further comprising applying an anti-corrosion coating, a sealer coating, a primer coating, a tie coating, an adhesion-promoting coating, or a combination thereof to the surface of the substrate before the applying of the curable composition.

16. The method of claim 12, wherein the curable composition is applied to the surface of the substrate in an amount effective to inhibit formation of a biofilm on the surface of the substrate.

17. The method of claim 12, wherein the anti-fouling coating has a thickness of 5 to 5,000 micrometers.

18. The method of claim 12, wherein the curable composition comprises
a first monomer of formula (1)

          (1);

optionally a second monomer of formula (2)

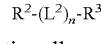          (2); and optionally an adhesion promoter, a crosslinking agent, a polymerization initiator, or a combination thereof,
wherein, in formulae (1) and (2),
$R^1$ and $R^2$ are each independently a polymerizable group;
$R^3$ is hydrogen, halide, hydroxy, amino, thiol, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), —N(R$^9$)(R$^1$), or a second polymerizable group;

each occurrence of L$^1$ is independently C$_{1-12}$ alkylene, C$_{2-12}$ alkenylene, C$_{6-12}$ arylene, —C(O)—, —O—, —N(R$^{11}$)—, —S—, —S(O)—, —S(O)$_2$—, or —Si(O)(R$^{12}$)(R$^{13}$)—;

each occurrence of L$^2$ is independently C$_{1-12}$ alkylene, C$_{2-12}$ alkenylene, C$_{6-12}$ arylene, —C(O)—, —O—, —N(R$^{11}$)—, —S—, —S(O)—, —S(O)$_2$—, or —Si(O)(R$^{12}$)(R$^{13}$)—;

R$^4$ to R$^6$ are each independently hydrogen, C$_{1-12}$ alkyl, C$_{1-12}$ alkoxy, C$_{2-12}$ alkoxyalkyl, C$_{2-12}$ alkenyl, C$_{2-12}$ alkenyloxy, C$_{3-8}$ cycloalkyl, C$_{3-8}$ cycloalkoxy, C$_{6-14}$ aryl, C$_{6-10}$ aryloxy, C$_{7-13}$ aryloxyalkyl, C$_{7-13}$ arylalkyl, C$_{7-13}$ arylalkoxy, C$_{7-13}$ alkylaryl, or C$_{7-13}$ alkylaryloxy;

R$^7$ to R$^{11}$ are each independently hydrogen, C$_{1-12}$ alkyl, C$_{2-12}$ alkoxyalkyl, C$_{2-12}$ alkenyl, C$_{3-8}$ cycloalkyl, C$_{6-14}$ aryl, C$_{7-13}$ aryloxyalkyl, C$_{7-13}$ arylalkyl, or C$_{7-13}$ alkylaryl;

R$^{12}$ to R$^{13}$ are each independently C$_{1-12}$ alkyl, C$_{1-12}$ alkoxy, C$_{2-12}$ alkoxyalkyl, C$_{2-12}$ alkenyl, C$_{2-12}$ alkenyloxy, C$_{3-8}$ cycloalkyl, C$_{3-8}$ cycloalkoxy, C$_{6-14}$ aryl, C$_{6-10}$ aryloxy, C$_{7-13}$ aryloxyalkyl, C$_{7-13}$ arylalkyl, C$_{7-13}$ alkoxyaryl, or C$_{7-13}$ alkylaryl;

Q is the quorum sensing inhibitor; and m and n are each independently 0 to 1,000.

19. The method of claim 12, wherein the substrate is a marine structure comprising a metal, an alloy, a thermoplastic, a thermoset resin, a wood, a fiber, or a combination thereof.

20. The method of claim 19, wherein the marine structure is a ship hull, a propeller, a rudder, a keel, a centerboard, a fin, a hydrofoil, a deck surface, a buoy, a pier, a wharf, a jetty, a fishing net, a cooling system surface, a cooling water intake or discharge pipe, a nautical beacon, a floating beacon, a floating breakwater, a dock, a pipeline, a tank, a bridge, a bell, a plumb, a dredge, a pump, a valve, a rope, a ladder, a pontoon, an antenna, a periscope, a snorkel, a gun mount, a gun barrel, a launch tube, a mine, a torpedo, or a depth charge.

* * * * *